(12) United States Patent
Marinier et al.

(10) Patent No.: US 10,498,513 B2
(45) Date of Patent: Dec. 3, 2019

(54) METHODS FOR DYNAMIC MANAGEMENT OF REFERENCE SIGNALS

(71) Applicant: IDAC HOLDINGS, INC., Wilmington, DE (US)

(72) Inventors: Paul Marinier, Brossard (CA); J. Patrick Tooher, Montreal (CA); Ghyslain Pelletier, Montreal (CA)

(73) Assignee: IDAC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/064,311

(22) PCT Filed: Dec. 29, 2016

(86) PCT No.: PCT/US2016/069276
§ 371 (c)(1),
(2) Date: Jun. 20, 2018

(87) PCT Pub. No.: WO2017/117424
PCT Pub. Date: Jul. 6, 2017

(65) Prior Publication Data
US 2019/0007181 A1     Jan. 3, 2019

Related U.S. Application Data

(60) Provisional application No. 62/273,988, filed on Dec. 31, 2015.

(51) Int. Cl.
*H04L 5/00*     (2006.01)
*H04W 72/04*     (2009.01)

(52) U.S. Cl.
CPC .......... *H04L 5/0051* (2013.01); *H04L 5/0007* (2013.01); *H04L 5/0053* (2013.01); *H04L 5/0091* (2013.01); *H04W 72/042* (2013.01)

(58) Field of Classification Search
CPC ....... H04L 5/0051; H04L 5/0057; H04L 5/00; H94L 5/0091
See application file for complete search history.

(56) References Cited

U.S. PATENT DOCUMENTS

2012/0127948 A1    5/2012   Chung et al.
2014/0328260 A1   11/2014   Papasakellariou et al.
(Continued)

FOREIGN PATENT DOCUMENTS

| WO | WO 2015/076712 A1 | 5/2015 |
|---|---|---|
| WO | WO 2016/029736 A1 | 3/2016 |
| WO | WO 2016/040290 A1 | 3/2016 |

OTHER PUBLICATIONS

3rd Generation Partnership Project (3GPP), R1-155738, "Discussion on DM-RS Enhancements for FD-MIMO", Qualcomm Inc., 3GPP TSG-RAN WG1 #82bis, Malmö, Sweden, Oct. 5-9, 2015, 4 pages.
(Continued)

*Primary Examiner* — Albert T Chou
(74) *Attorney, Agent, or Firm* — Condo Roccia Koptiw LLP

(57) ABSTRACT

Methods for dynamic allocation of reference signals (RS) may be provided. For example, rather than or in addition to using a pre-defined resource element (RE) mapping for determining reference signal locations within a time-frequency grid, a WTRU may receive one or more dynamic indications (e.g., downlink control information received via a physical downlink control channel) that indicate the position of reference signals and/or associate a first reference signal with a second reference signal. For example, the indicated association may indicate that the first and second reference signals were sent by the base station using the same precoder. The association may indicate that first and second reference signals may be used together for channel estimation.

20 Claims, 13 Drawing Sheets

(56) References Cited

U.S. PATENT DOCUMENTS

| | | |
|---|---|---|
| 2015/0071209 A1 | 3/2015 | Chae et al. |
| 2015/0358134 A1 | 12/2015 | Hammarwall et al. |
| 2016/0270059 A1 | 9/2016 | Chen et al. |
| 2017/0126376 A1* | 5/2017 | Wang .................... H04L 5/0044 |
| 2017/0164363 A1 | 6/2017 | Zhang et al. |
| 2017/0181132 A1* | 6/2017 | Xiao .................... H04B 7/0626 |
| 2018/0254869 A1* | 9/2018 | Li ............................ H04L 5/00 |
| 2019/0082429 A1* | 3/2019 | Xiao .................... H04B 7/0626 |

OTHER PUBLICATIONS $3^{rd}$ Generation Partnership Project (3GPP), R1-155764, "Considerations on DMRS Enhancements", NTT DoCoMo, 3GPP TSG RAN WG1 Meeting #82bis, Malmö, Sweden, Oct. 5-9, 2015, 4 pages.
$3^{rd}$ Generation Partnership Project (3GPP), R1-165294, "DCI for sTTI Scheduling", Ericsson, 3GPP TSG-RAN WG1 #85, Nanjing, P.R. China, May 23-27, 2016, 5 pages.
$3^{rd}$ Generation Partnership Project (3GPP), TS 36.211 V12.5.0, "Technical Specification Group Radio Access Network, Evolved Universal Terrestrial Radio Access (E-UTRA), Physical Channels and Modulation (Release 12)", Mar. 2015, 136 pages.
WO 2016/029736 A1, US 2017/0164363 A1.

* cited by examiner

METHODS FOR DYNAMIC MANAGEMENT OF REFERENCE SIGNALS

CROSS-REFERENCE TO RELATED APPLICATION

This application is the National Stage entry under 35 U.S.C. § 371 of Patent Cooperation Treaty Application PCT/US2016/069276, filed Dec. 29, 2016, which claims the benefit of U.S. Provisional Patent Application No. 62/273,988, filed Dec. 31, 2015, the contents of which are incorporated by reference herein.

BACKGROUND

Mobile communications may be in continuous evolution, for example we are at the doorstep of its fifth incarnation (e.g., 5G). As with previous generations, new use cases and design goals may drive many new, often competing requirements for the system. Building upon basic technologies already known from conventional Orthogonal Frequency-Division Multiple Access (OFDMA) and legacy Long Term Evolution (LTE) systems, the principles and operation of a flexible radio access system for 5G are described.

SUMMARY

Methods for dynamic allocation of reference signals (RS) may be provided. For example, rather than or in addition to using a pre-defined resource element (RE) mapping for determining reference signal locations within a time-frequency grid, a WTRU may receive one or more dynamic indications (e.g., downlink control information received via a physical downlink control channel) that indicate a position(s) of reference signals and/or associate a first reference signal with a second reference signal. For example, the indicated association may indicate that the first and second reference signals were sent by the base station using the same precoder. The association may indicate that first and second reference signals may be used together for channel estimation. Either or both of the first and/or second reference signals may be received prior to the dynamic indication. Either or both of the first and/or second reference signals may be received subsequent to the dynamic indication. One of the first or second reference signals may be received prior to the dynamic indication and the other of the first or second reference signals may be received after the dynamic indication.

For example, a wireless transmit/receive unit (WTRU) may perform dynamic demodulation. The WTRU may receive a first reference signal over a first set of resources. The WTRU may receive a downlink control information (DCI) indicating that the first set of resources and a second set of resources associated with a second set of resources are associated with a precoder set. The DCI may indicate a position of the second set of resources relative to a position of the first set of resource. The WTRU may receive the second reference signal over the second set of resources. The WTRU may perform a channel estimate based on a combination of the first reference signal and the second reference signal and receive first data based on the channel estimate. The WTRU may receive a third reference signal over a third set of resources and a subsequent indication indicating that the first set of resources and the second set of resources are no longer associated with the first precoder set. The subsequent indication may further indicate that the third set of resources are associated with the first precoder set. The WTRU may perform a second channel estimate based on the third reference signal and receive second data based on the second channel estimate.

DETAILED DESCRIPTION

A detailed description of illustrative embodiments will now be described with or without reference to the various figures. Although this description provides a detailed example of possible implementations, it should be noted that the details are intended to be exemplary and in no way limit the scope of the application.

Figure 1A:
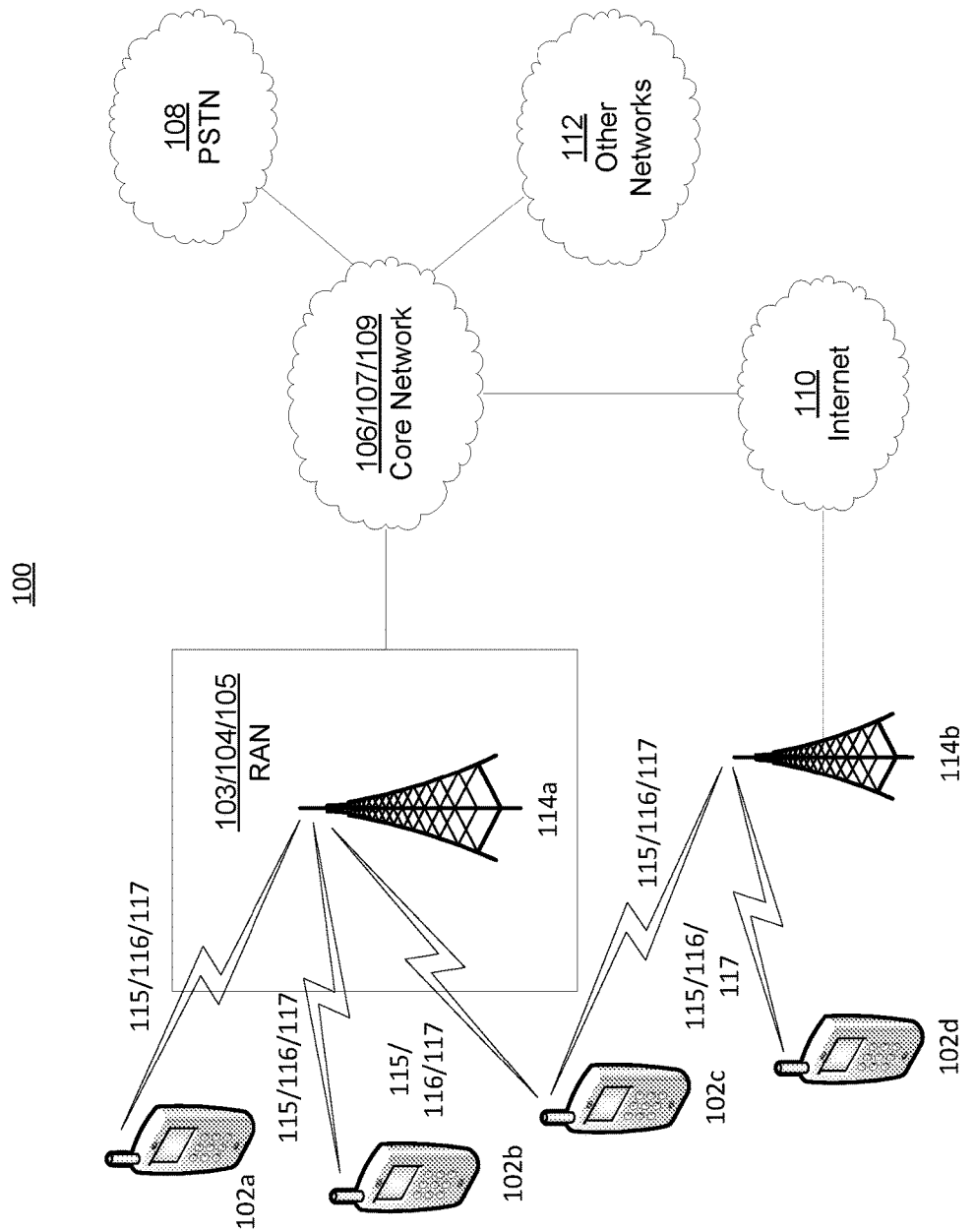
FIG. 1A is a system diagram of an example communications system.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and/or the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (WTRU), a mobile station, a fixed or mobile subscriber unit, a pager, a cellular telephone, a personal digital assistant (PDA), a smartphone, a laptop, a netbook, a personal computer, a wireless sensor, consumer electronics, and/or the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and/or the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and/or the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and/or the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and/or the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be used to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

One or more of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1a may be configured to communicate with the base station 114a, which may employ a cellular-based radio technology, and with the base station 114b, which may employ an IEEE 802 radio technology.

Figure 1B:
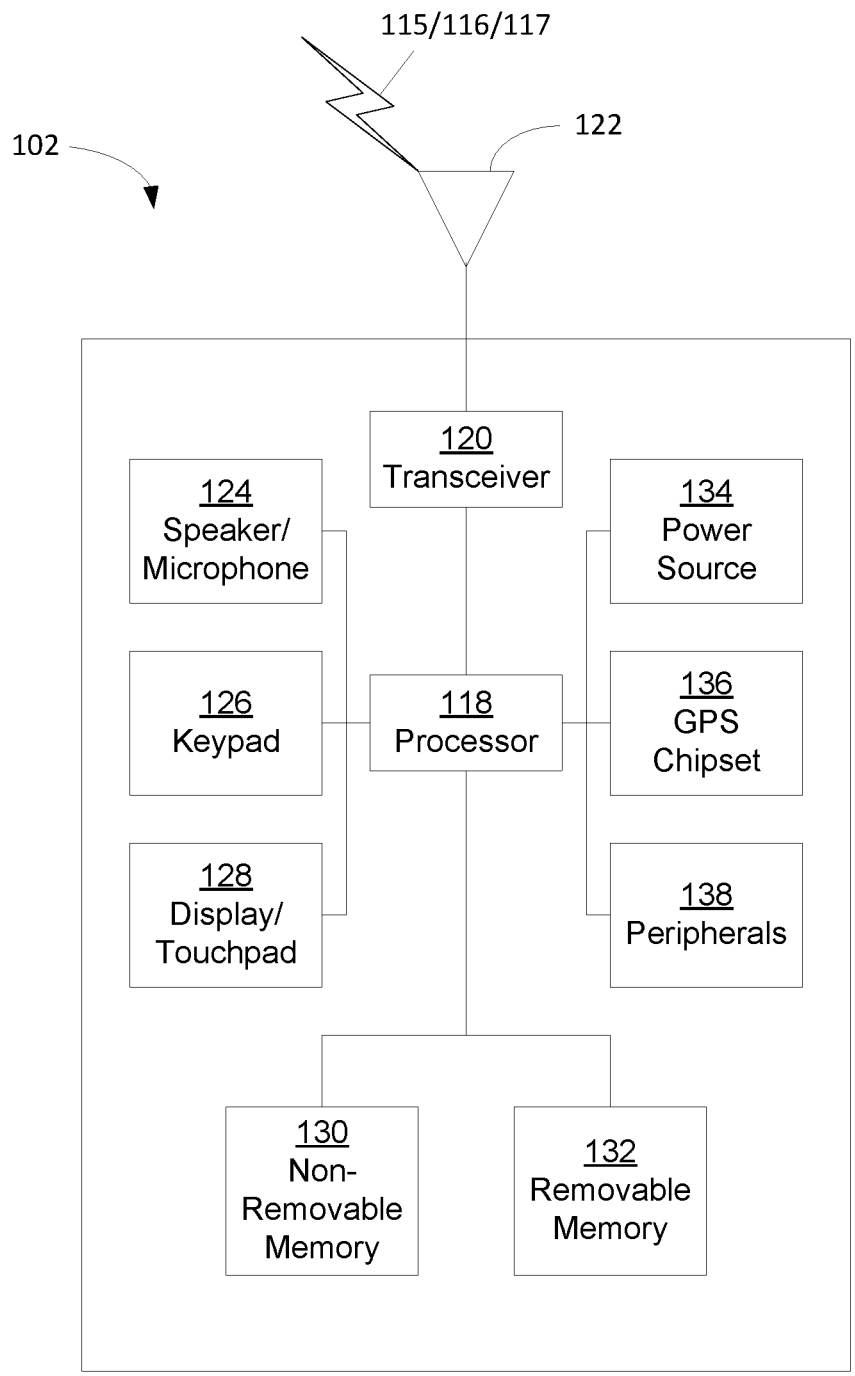
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include one or more of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and/or the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and/or the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and/or the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and/or the like.

Figure 1C:
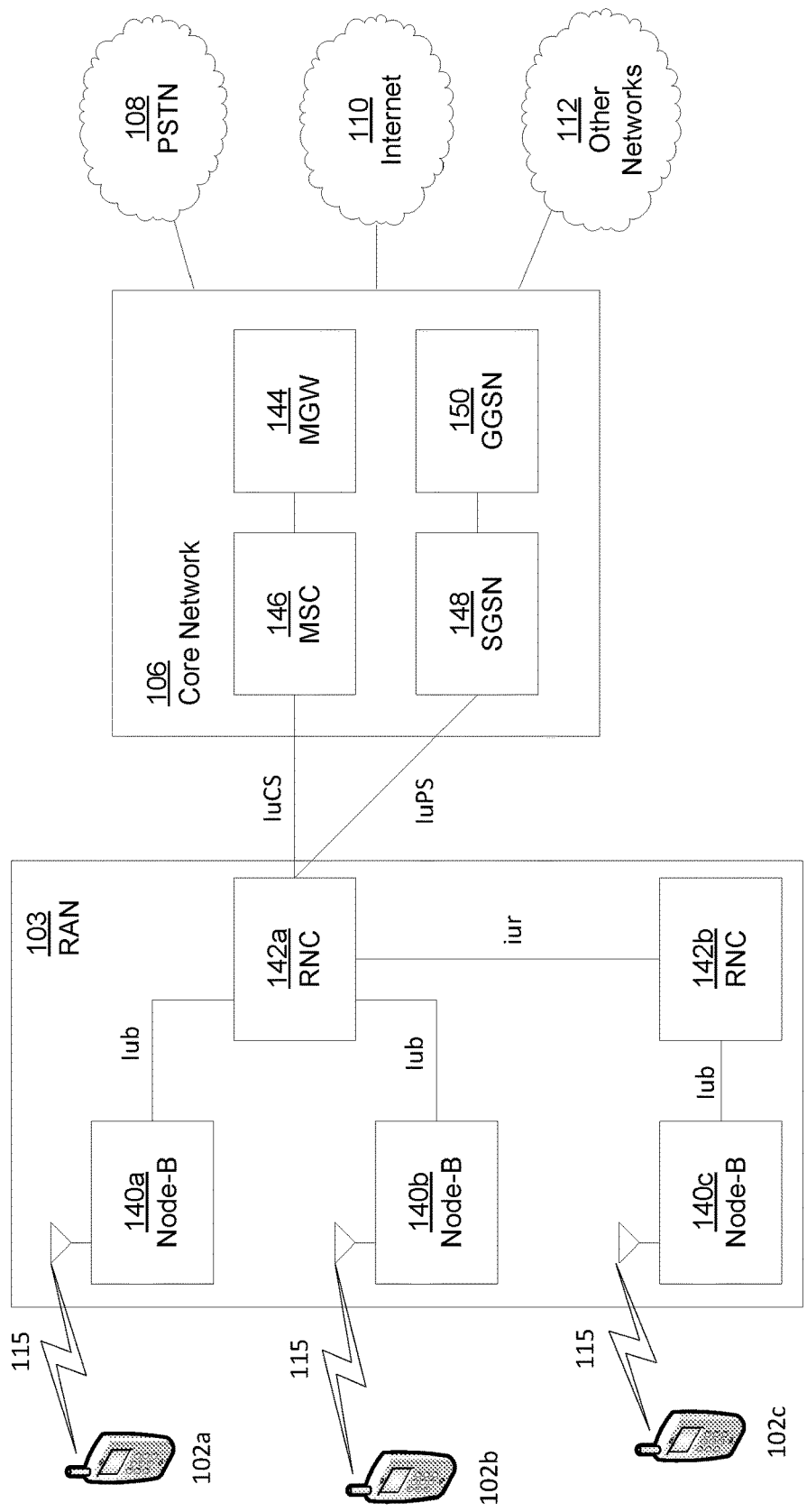
FIG. 1C is a system diagram of an example radio access network and an example core network that may be Used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and/or the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
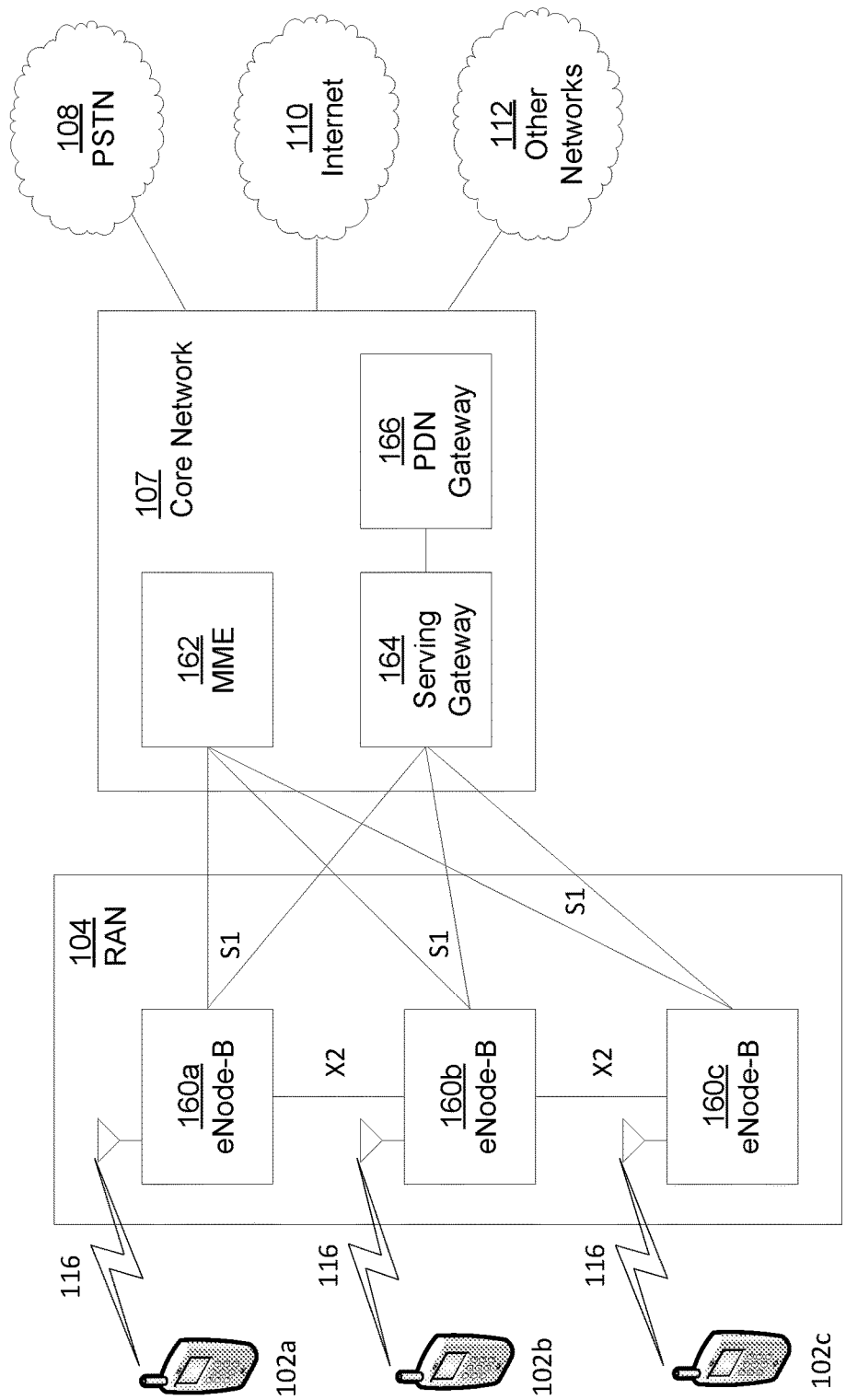
FIG. 1D is a system diagram of another example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and/or the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and/or the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and/or the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
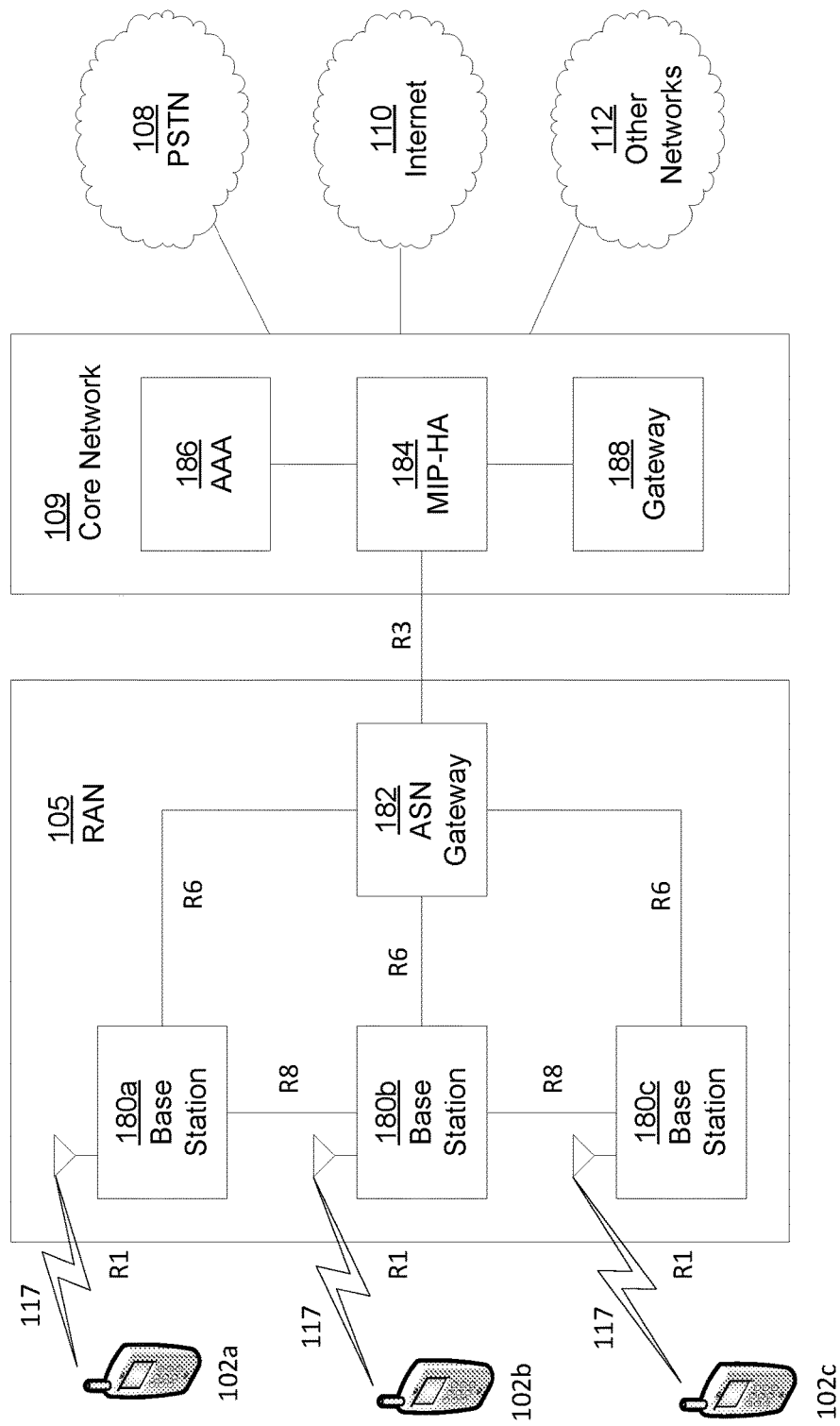
FIG. 1E is a system diagram of another example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102*b*, 102*c* over the air interface 117. In one embodiment, the base stations 180*a*, 180*b*, 180*c* may implement MIMO technology. Thus, the base station 180*a*, for example, may use multiple antennas to transmit wireless signals to, and receive wireless signals from, the WTRU 102*a*. The base stations 180*a*, 180*b*, 180*c* may also provide mobility management functions, such as handoff triggering, tunnel establishment, radio resource management, traffic classification, quality of service (QoS) policy enforcement, and/or the like. The ASN gateway 182 may serve as a traffic aggregation point and may be responsible for paging, caching of subscriber profiles, routing to the core network 109, and/or the like.

The air interface 117 between the WTRUs 102*a*, 102*b*, 102*c* and the RAN 105 may be defined as an R1 reference point that implements the IEEE 802.16 specification. In addition, each of the WTRUs 102*a*, 102*b*, 102*c* may establish a logical interface (not shown) with the core network 109. The logical interface between the WTRUs 102*a*, 102*b*, 102*c* and the core network 109 may be defined as an R2 reference point, which may be used for authentication, authorization, IP host configuration management, and/or mobility management.

The communication link between each of the base stations 180*a*, 180*b*, 180*c* may be defined as an R8 reference point that includes protocols for facilitating WTRU handovers and the transfer of data between base stations. The communication link between the base stations 180*a*, 180*b*, 180*c* and the ASN gateway 182 may be defined as an R6 reference point. The R6 reference point may include protocols for facilitating mobility management based on mobility events associated with each of the WTRUs 102*a*, 102*b*, 102*c*.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102*a*, 102*b*, 102*c* to roam between different ASNs and/or different core networks. The MIP-HA 184 may provide the WTRUs 102*a*, 102*b*, 102*c* with access to packet-switched networks, such as the Internet 110, to facilitate communications between the WTRUs 102*a*, 102*b*, 102*c* and IP-enabled devices. The AAA server 186 may be responsible for user authentication and for supporting user services. The gateway 188 may facilitate interworking with other networks. For example, the gateway 188 may provide the WTRUs 102*a*, 102*b*, 102*c* with access to circuit-switched networks, such as the PSTN 108, to facilitate communications between the WTRUs 102*a*, 102*b*, 102*c* and land-line communications devices. In addition, the gateway 188 may provide the WTRUs 102*a*, 102*b*, 102*c* with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102*a*, 102*b*, 102*c* between the RAN 105 and the other ASNs. The communication link between the core network 109 and the other core networks may be defined as an R5 reference, which may include protocols for facilitating interworking between home core networks and visited core networks.

Below is a list of acronyms that may be used herein:
$\Delta f$ Sub-carrier spacing
5gFlex 5G Flexible Radio Access Technology
5gNB 5GFlex NodeB
ACK Acknowledgement
BLER Block Error Rate
BTI Basic TI (in integer multiple of one or more symbol duration)
CB Contention-Based (e.g. access, channel, resource)
CoMP Coordinated Multi-Point transmission/reception
CP Cyclic Prefix
CP-OFDM cyclic prefix based OFDM
CQI Channel Quality Indicator
CN Core Network (e.g. LTE packet core)
CRC Cyclic Redundancy Check
CSI Channel State Information
D2D Device to Device transmissions (e.g. LTE Sidelink)
DCI Downlink Control Information
DL Downlink
DMRS Demodulation Reference Signal
DRB Data Radio Bearer
EPC Evolved Packet Core
FBMC Filtered Band Multi-Carrier
FBMC/OQAM A FBMC technique using Offset Quadrature Amplitude Modulation
FDD Frequency Division Duplexing
FDM Frequency Division Multiplexing
FDMA Frequency Division Multiple Access
HARQ Hybrid Automatic Repeat Request
ICC Industrial Control and Communications
ICIC Inter-Cell Interference Cancellation
IP Internet Protocol
LAA License Assisted Access
LBT Listen-Before-Talk
LCH Logical Channel
LCP Logical Channel Prioritization
LTE Long Term Evolution e.g. from 3GPP LTE R8 and up
MAC Medium Access Control
NACK Negative ACK
MC MultiCarrier
MCS Modulation and Coding Scheme
MIMO Multiple Input Multiple Output
MTC Machine-Type Communications
NAS Non-Access Stratum
OFDM Orthogonal Frequency-Division Multiplexing
OOB Out-Of-Band (emissions)
OQAM Offset Quadrature Amplitude Modulation
$P_{cmax}$ Total available UE power in a given TI
PHY Physical Layer
PRACH Physical Random Access Channel
PRB Physical Resource Block
PRG Precoding Resource Group
PDU Protocol Data Unit
PER Packet Error Rate
PLR Packet Loss Rate
PMI Precoding Matrix Indicator
PTI Precoding Type Indicator
QoS Quality of Service (from the physical layer perspective)
RAB Radio Access Bearer
RACH Random Access Channel (or procedure)
RF Radio Front end RNTI Radio Network Identifier
RRC Radio Resource Control
RRM Radio Resource Management
RS Reference Signal
RTT Round-Trip Time
SCMA Single Carrier Multiple Access
SDU Service Data Unit
SOM Spectrum Operation Mode
SS Synchronization Signal
SRB Signaling Radio Bearer
SWG Switching Gap (in a self-contained subframe)
TB Transport Block
TDD Time-Division Duplexing
TDM Time-Division Multiplexing
TDMA Time Division Multiple Access
TI Time Interval (in integer multiple of one or more BTI)
TTI Transmission Time Interval (in integer multiple of one or more TI)
TRx Transceiver
UFMC Universal Filtered MultiCarrier
UF-OFDM Universal Filtered OFDM
UL Uplink
V2V Vehicle to vehicle communications
V2X Vehicular communications
WLAN Wireless Local Area Networks and related technologies (IEEE 802.xx domain)

Reference signals may be used by a WTRU to facilitate reception of a downlink signal (e.g., for demodulation). A demodulation reference signal (DMRS) may enable decoding of a transmission on a physical channel. DMRS may be used for channel estimation and/or for coherent demodulation of transmission of data and/or control information. DMRS may be related to a channel quality (e.g., of a frequency region). When receiving a transmission, a WTRU may estimate a channel response for a given frequency region for a duration of the transmission based on the DMRS. A receiver may extrapolate and perform channel estimation using one or more reference signals and/or symbols. For Long Term Evolution (LTE), DMRS in LTE may include a constant amplitude zero autocorrelation (CAZAC) sequence. A transmitter may generate a DMRS using a number of parameters. For example, a transmitter may use a number of parameters to create a Zadoff-Chu sequence to generate the DMRS. Some or all of the parameters may be provided by higher layers. For example, the parameters may comprise configuration aspects of the transmitter. Reference signals and/or symbols may be inserted in resources (e.g., a resource block) and/or transmitted with data. When multiple antenna ports are configured, reference signals and/or symbols applicable to different antenna ports may be offset from each other in the frequency domain. When a reference signal is transmitted using an antenna port, other antenna ports (e.g., the other antenna ports in the frequency location of the antenna port at a time) may not transmit control information and/or data on the resources (e.g., a resource element) used to transmit the reference signal. For uplink transmissions on physical uplink shared channel (PUSCH), DMRS may be transmitted/received via a center symbol of a slot. For example, the center symbol of a slot may be symbol 3 and symbol 10 for an uplink subframe.

Modulation signals/symbols may be mapped onto different antennas in multi-antenna techniques. For example, precoding may be used to map the modulation signals/symbols onto different antennas in multi-antenna techniques. The type of precoding used may differ depending on one or more of the following: the multi-antenna techniques used, the number of layers, and/or the number of antenna ports. A WTRU may be configured to support an assumption that a same precoding may be applied to multiple resource blocks (e.g., consecutive resource blocks in the frequency domain). A set of resource blocks to which the same precoding is applied may comprise a precoding resource group (PRG). The size of a PRG may be in number of physical resource blocks (PRBs). The size of a PRG may be a function of a system bandwidth. The precoding applied may be that of a relatively recent precoding matrix indicated in downlink control signaling for a given HARQ process.

The WTRU may be configured to report precoding information. For example, the precoding information may be precoding type indication (PTI) and/or precoding matrix indication (PMI).

A flexible radio access may be used for 5G to accommodate various senarios. 5G air interface may enable one or more of the following senarios: an improved broadband performance (IBB), industrial control and communications (ICC) and vehicular applications (V2X), massive Machine-Type Communications (mMTC), and/or the like.

To accommodate various scenarios (e.g., supporting relative levels of backward compatibility), 5G interface may support one or more of the following: baseband filtering of a frequency-domain waveform, an ultra-low transmission latency, an ultra-reliable transmission, and MTC operation (e.g., a narrowband operation), and/or the like.

5G interface may support baseband filtering of frequency-domain waveform that enables aggregation of a range of spectrum. For example, a baseband filtering of the frequency-domain waveform may enable effective aggregation of 150-200 MHz spectrum (e.g., up to 150-200 MHz total) without relying on a re-design of the radio frequency (RF) front end of a legacy LTE system. The aggregation of up to 150-200 MHz total spectrum may be within a given RF transceiver path. Antenna size design (e.g., antenna size requirements) and/or amplifier optimization design constraints may limit aggregation of spectrum across separated operating bands. Multiple RF transceiver chains may be used to enable aggregation of spectrum across separated operating bands (e.g., an aggregation of 900 MHz and 3.5 GHz spectrums). For example, a WTRU implementation may include one or more of the following separate RF transceiver paths: a RF transceiver path below 1 GHz, a RF transceiver path for the 1.8-3.5 GHz frequency range, and/or a RF transceiver path covering the 4-6 GHz frequency range. A native built-in support for massive MIMO antenna configurations may be implemented. For example, the native built-in support for massive MIMO antenna configurations may be a second order requirement.

Aggregation of multiple frequency bands with spectrum of varying sizes may be used to achieve a range of data rates. For example, IBB may use efficient aggregation of multiple frequency bands of varying spectrum sizes to achieve a relative wide range of data rates. The data rates may be in the order of several tens of Mbps at cell edge and/or on the order of several Gbps under nominal conditions (e.g., up to peak data rates or 8 Gbps). The average data rates (e.g., typical rates) may be in the order of several hundreds of Mbps.

5G interface may support an ultra-low transmission latency by supporting a range of transmission time interval (TTI) sizes. Air interface latency may be based on round-trip time (RTT). For example, 5G interface may support shorter TTIs (e.g., 100 us to 250 us) than legacy systems to achieve an air interface latency of 1 ms RTT. 5G interface may support ultra-low access latency. Access latency may be based on time from an initial system access until a completion of a transmission of the first user plane data unit. One or more of use cases may be based on an end-to-end (e2e) latency of less than 10 ms. These use cases may include at least industrial control and communications (ICC) and vehicular communications (V2X).

5G interface may support an ultra-reliable transmission and/or a service reliability. Transmission reliability for 5G interface may be improved over legacy LTE systems. For example, a 99.999% transmission success rate and/or service availability may be achieved. 5G interface may support mobility for speed (e.g., in the range of 0-500 km/h). Packet loss rate (PLR) of less than $10e^{-6}$ may be used for one or more of use cases. These use cases may include at least ICC and V2X.

5G interface may support an MTC operation (e.g., by supporting a narrowband operation), an extended battery life, and/or a minimal communication overhead. For example, 5G interface may support a narrowband operation at 200 KHz. 5G interface may support an extended battery life. For example, the battery life may be up to 15 years of autonomy. 5G interface may support minimal communication overhead for relatively small and/or infrequent data transmissions. For example, 5G interface may support a low data rate in the range of 1-100 kbps with access latency of seconds to hours. 5G interface may support mMTC use cases by supporting narrowband operations. A resulting link budget may be comparable to that of LTE extended coverage. The resulting link budget may support a number of MTC devices (e.g., a relatively large number of MTC devices or up to 200 k/km$^2$) without an adverse impact on spectral efficiency for other supported services.

A 5G system that may include a 5G interface described herein may integrate with a number of legacy (e.g., Evolved Universal Mobile Telecommunications Service Terrestrial Radio Access Network (E-UTRAN) and evolved packet core/core network (EPC/CN)) aspects and/or enable a flexible spectrum usage, deployment strategies and/or operation. One or more of the following functionality supported by legacy systems may be supported in the 5G system: a device to device transmission (D2D)/sidelink operation, an LAA operation, and/or relaying. The LAA operation may be supported using listen before talk (LBT).

The 5G system herein may enable flexible spectrum usage, deployment strategies, and/or operation. The 5G system herein may support operation using spectrum of varying sizes. For example, the 5G system herein may aggregate non-adjacent carriers in the same and/or in different frequency bands. The frequency bands may be licensed or unlicensed. The 5G system herein may support one or more of the following: narrowband and wideband operations, different duplexing techniques (e.g., dynamically variable downlink/uplink (DL/UL) allocation for time-division duplexing (TDD)), variable TTIs lengths, scheduled and unscheduled transmissions, synchronous and asynchronous transmissions, separation of user plane from the control plane, multi-node connectivity, and/or the like.

The 5G system herein may integrate with a number of legacy E-UTRAN and EPC/CN aspects. Backward compatibility may or may not be used. The 5G system herein may integrate and/or operate with legacy interfaces or evolution of legacy interfaces. For example, the 5G system herein may operate towards legacy CN (e.g., the S1 interface, non-access stratum (NAS)) and/or eNodeB (e.g., the X2 interface including dual connectivity with LTE). The 5G system herein may enable legacy aspects. For example, the 5G system herein may support legacy quality of service (QoS) and/or security mechanisms.

Elements of the 5G system herein may be retrofitted in LTE and/or LTE advanced. For example, backward compatibility of some or all components of the 5G system herein may be implemented. TTIs shorter than a LTE slot (e.g., 0.5 ms) may be used to enable ultra-low latency. The TTIs may use a different waveform. For example, the 5G physical layer (e.g., DL and/or UL) may be operated in time division multiplexing (TDM) and/or in frequency division multiplexing (FDM) with LTE.

A WTRU may be configured to apply a flexible radio access system for communication using 5G. Flexible radio access operations for 5G may be referred to herein as 5gFLEX. The 5gFLEX may use OFDM (e.g., at least for the downlink transmission scheme) and/or focus on other waveform candidates than OFDM.

OFDM may be used as a basic signal format for data transmissions in both LTE and in IEEE 802.11. OFDM may divide a spectrum into multiple parallel orthogonal subbands. A subcarrier may be shaped using a rectangular window in the time domain. Such shaped subcarrier may lead to sinc-shaped subcarriers in the frequency domain. OFDMA may use a perfect frequency synchronization and/or a tight management of uplink timing alignment within the duration of a cyclic prefix to maintain an orthogonality between signals and/or minimize an inter-carrier interference.

A system where a WTRU is connected to multiple access points relatively simultaneously may use a synchronization or uplink timing alignment other than the perfect frequency synchronization or tight management of uplink timing alignment. Additional power reduction may be applied to uplink transmissions to comply with spectral emission requirements to adjacent bands. For example, additional power reduction may be applied in the presence of aggregation of fragmented spectrum for a WTRU's transmissions.

Relatively stringent RF requirements for implementations may be applied to avoid at least perfect frequency synchronization. For example, more stringent RF requirements for implementations may be used when operating using a contiguous spectrum. The contiguous spectrum may not use aggregation. A downlink physical layer for 5G similar to a downlink physical layer for a legacy system may be used in a cyclic prefix (CP)-based OFDM transmission scheme. A reference signal characteristics (e.g., pilot signal density and location) may be modified.

A flexible radio access may include a transmission scheme based on a multicarrier waveform, spectrum flexibility, scheduling and rate control of multiple modes, and/or block coding.

The transmission scheme may be based on a multicarrier waveform and/or characterized by relatively high spectral containment. For example, the relatively high spectral containment may include relatively lower side lobes and relatively lower out-of-band (OOB) emissions. Example MC waveforms for 5G may include, but are not limited to, OFDM-offset quadrature amplitude modulation (OQAM) and universal filtered multicarrier (UFMC) (e.g., Universal Filtered OFDM (UF-OFDM)). Multicarrier modulation waveforms may divide a channel into subchannels. Multicarrier modulation waveforms may modulate data symbols on subcarriers in the subchannels.

With OFDM-OQAM, a filter may be applied in the time domain per subcarrier to the OFDM signal to reduce OOB. OFDM-OQAM may cause relatively low interference to adjacent bands. OFDM-OQAM may or may not use large guard bands. OFDM-OQAM may include a filter bank multicarrier (FBMC) scheme and/or a discrete-time formalization of the staggered multitone (SMT) multicarrier modulation scheme. OFDM-OQAM may or may not use a cyclic prefix. OFDM-OQAM may be a popular FBMC technique. OFDM-OQAM may be sensitive to multipath effects. OFDM-OQAM may be sensitive to high delay spread in terms of orthogonality. OFDM-OQAM may complicate equalization and channel estimation.

With UFMC (e.g., UF-OFDM), a filter may be applied in the time domain to the OFDM signal to reduce OOB. For example, filtering may be applied per subband to use spectrum fragments such that complexity may be reduced. UF-OFDM may be more practical to implement than other candidate waveforms. For example, UF-OFDM may be less expensive in terms of hardware. OOB emissions in the spectrum fragments may remain relatively high. For example, OOB emissions in the fragments may remain as high as for conventional OFDM when there are unused spectrum fragments in the band. UF-OFDM may improve over OFDM at the edges of the filtered spectrum, but may or may not improve over OFDM in the spectral hole. Techniques and procedures described herein may or may not be limited to the waveforms described herein. Techniques and procedures described herein may be applicable to other waveforms. The examples described herein may be applicable to the waveforms described herein and/or other types of waveforms. The uplink and downlink transmission scheme may use same or different waveforms. Multiplexing of transmissions to and/or from different WTRUs in the same cell may be based on FDMA and/or TDMA.

Multicarrier modulation waveforms herein may enable multiplexing of signals with non-orthogonal characteristics in frequency domain and/or co-existence of asynchronous signals. The non-orthogonal characteristics may include different subcarrier spacing for signals in frequency domain. The multicarrier modulation waveforms herein may or may not use complex interference cancellation receivers. The waveforms herein may facilitate the aggregation of fragmented pieces of spectrum or the aggregation of fragmented spectrum in the baseband processing. The aggregation of fragmented spectrum in the baseband processing may be a lower cost alternative to the aggregation of fragmented spectrum as part of RF processing.

Co-existence of different waveforms within a same band may be used to support operations. For example, co-existence of different waveforms within the same band may be used to support mMTC narrowband operation. Single carrier multiple access (SCMA) may be used to support mMTC narrowband operation. The different waveforms within the same band may be one or more of the following: CP-OFDM, OFDM-OQAM, UF-OFDM, and/or the like. The support for the combination of one or more of them may be for some or all aspects of operation. The support for the combination/coexistence of multiple waveforms of one or more of them may be for downlink and/or uplink transmissions. The co-existence of different waveforms may include transmissions using different types of waveforms between different WTRUs. For example, the co-existence of different waveforms may include transmissions from different WTRUs simultaneously. The co-existence of different waveforms may include transmissions from different WTRUs with some overlap. The co-existence of different waveforms may include transmissions from different WTRUs consecutively in the time domain. The co-existence of different waveforms may include transmissions from the same WTRU using the multiple waveforms. For example, the co-existence of different waveforms may include transmissions from the same WTRU simultaneously using the multiple waveforms. The co-existence of different waveforms may include transmissions from the same WTRUs with some overlap. The co-existence of different waveforms may include transmissions from the same WTRUs consecutively in the time domain.

Co-existence of different waveforms within the same band may include support for hybrid types of waveforms. The hybrid types of waveforms may include waveforms and/or transmissions that support one or more of a varying CP duration (e.g., from one transmission to another), a combination of a CP and a low power tail (e.g., a zero tail), and/or a form of hybrid guard interval and/or the like. The form of hybrid guard interval may include a low power CP and/or an adaptive low power tail. The waveforms may support dynamic variation and/or control of aspects including aspects associated with filtering. For example, the waveforms may support control of whether filtering is applied at the edge of the spectrum used for reception of a transmission(s) for a given carrier frequency. The waveforms may support control of whether filtering is applied at the edge of a spectrum used for reception of a transmission. The transmission may be associated with spectrum operating mode (SOM), or per subband, or per group of subbands.

The transmission scheme may be based on spectrum flexibility, and the spectrum flexibility may include flexibility in duplexing arrangement, bandwidth flexibility, flexible spectrum allocation, spectrum aggregation, and/or flexible timing. 5gFLEX radio access may be associated with a relatively high degree of spectrum flexibility. The spectrum flexibility may enable deployment in different frequency bands with different characteristics. The deployment may include one or more of the following: different duplex arrangements, different and/or variable sizes of the available spectrum including contiguous and non-contiguous spectrum allocations in the same or different bands. The spectrum flexibility may support variable timing aspects including support for multiple TTI lengths and/or support for asynchronous transmissions.

The spectrum flexibility may include flexibility in duplexing arrangement. 5gFLEX may use flexibility in duplexing arrangement. Both TDD and FDD duplexing schemes may be supported. For FDD operation, supplemental downlink operation may be supported using spectrum aggregation. FDD operation may support both full-duplex FDD and half-duplex FDD operation. For TDD operation, the DL/UL allocation may be dynamic. For example, the DL/UL allocation may or may not be based on a fixed DL/UL frame configuration. The length of a DL or a UL transmission interval may be set per transmission opportunity.

The spectrum flexibility may include bandwidth flexibility. 5gFLEX may use bandwidth flexibility. 5gFLEX may enable different transmission bandwidths on uplink and/or downlink transmissions. The transmission bandwidths may range from a nominal system bandwidth to a maximum value corresponding to a system bandwidth. The supported system bandwidths may be a bandwidth in a range. For example, the range may be one from a few MHz up to 160 MHz. For single carrier operation, the supported system bandwidths may include one or more of the following: 5, 10, 20, 40, and 80 MHz. Nominal bandwidths may have one or more fixed values. For example, narrowband transmissions of up to 200 KHz may be supported within the operating bandwidth for MTC devices.

Figure 2:
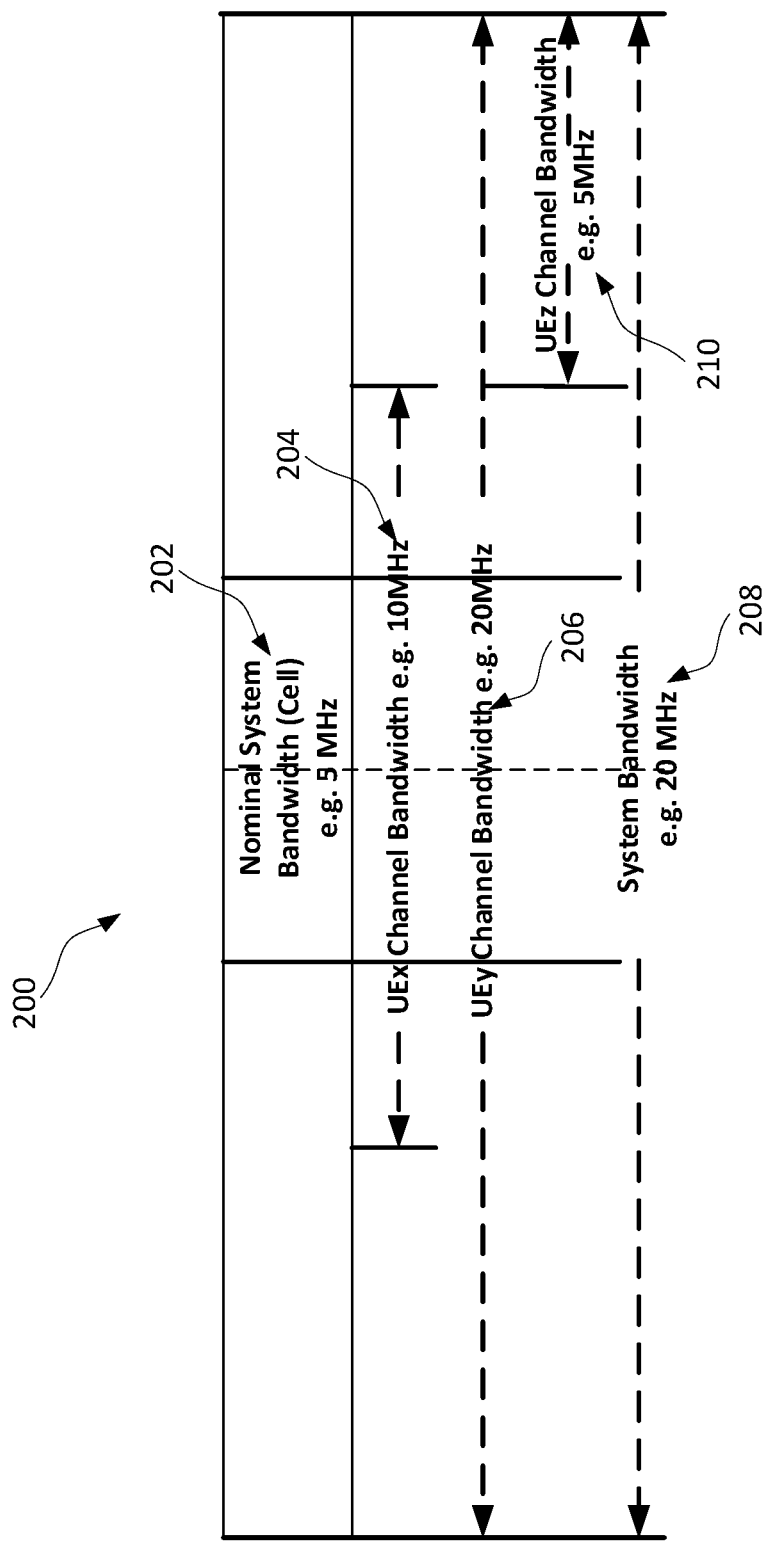
FIG. 2 illustrates an example of transmissions bandwidths.

FIG. 2 illustrates an example of transmissions bandwidths (200). System bandwidth herein may refer to the largest portion of spectrum that the network may be able to manage for a given carrier (e.g., 208). Nominal system bandwidth may refer to the portion that a WTRU minimally supports for cell acquisition, measurements and initial access to the network for the carrier (e.g., 202). The WTRU may be configured with a channel bandwidth (e.g., 204, 206, and 210) that is within the range of the entire system bandwidth. FIG. 2 shows that the WTRU's configured channel bandwidth may or may not include the nominal part of the system bandwidth.

Bandwidth flexibility may be achieved through support of baseband filtering of the frequency domain waveform. For example, some or all applicable sets of RF requirements for an (e.g., a given maximum) operating bandwidth in a band may be met. Additional allowed channel bandwidths for that operating band may or may not be introduced. For example, additional allowed channel bandwidths for that operating band may or may not be introduced when support of baseband filtering of the frequency domain waveform is efficient.

The 5gFLEX physical layer may be band-agnostic. The 5gFLEX physical layer may support operation in licensed bands below 5 GHz. The 5gFLEX physical layer may support operation in the unlicensed bands in the range 5-6 GHz. For operation in the unlicensed bands, LBT Cat 4 based channel access framework similar to LTE LAA may be supported.

The spectrum flexibility may include flexible spectrum allocation. 5gFLEX may use flexible spectrum allocation. Downlink control channels and/or signals may support FDM operation. A WTRU may acquire a downlink carrier by receiving transmissions using the nominal part of the system bandwidth. For example, the WTRU may not initially receive transmissions covering the entire bandwidth that is being managed by the network for the concerned carrier. Downlink data channels may be allocated over a bandwidth that may not correspond to the nominal system bandwidth. Downlink data channels may be allocated with or without restrictions. For example, a restriction may be being within the WTRU's configured channel bandwidth. For example, the network may operate a carrier with a 12 MHz system bandwidth and a 5 MHz nominal bandwidth. Devices may support a maximum RF bandwidth of 5 MHz to acquire and access the system. The devices may allocate +10 to −10 MHz of the carrier frequency to other WTRU's supporting up to 20 MHz worth of channel bandwidth.

Figure 3:
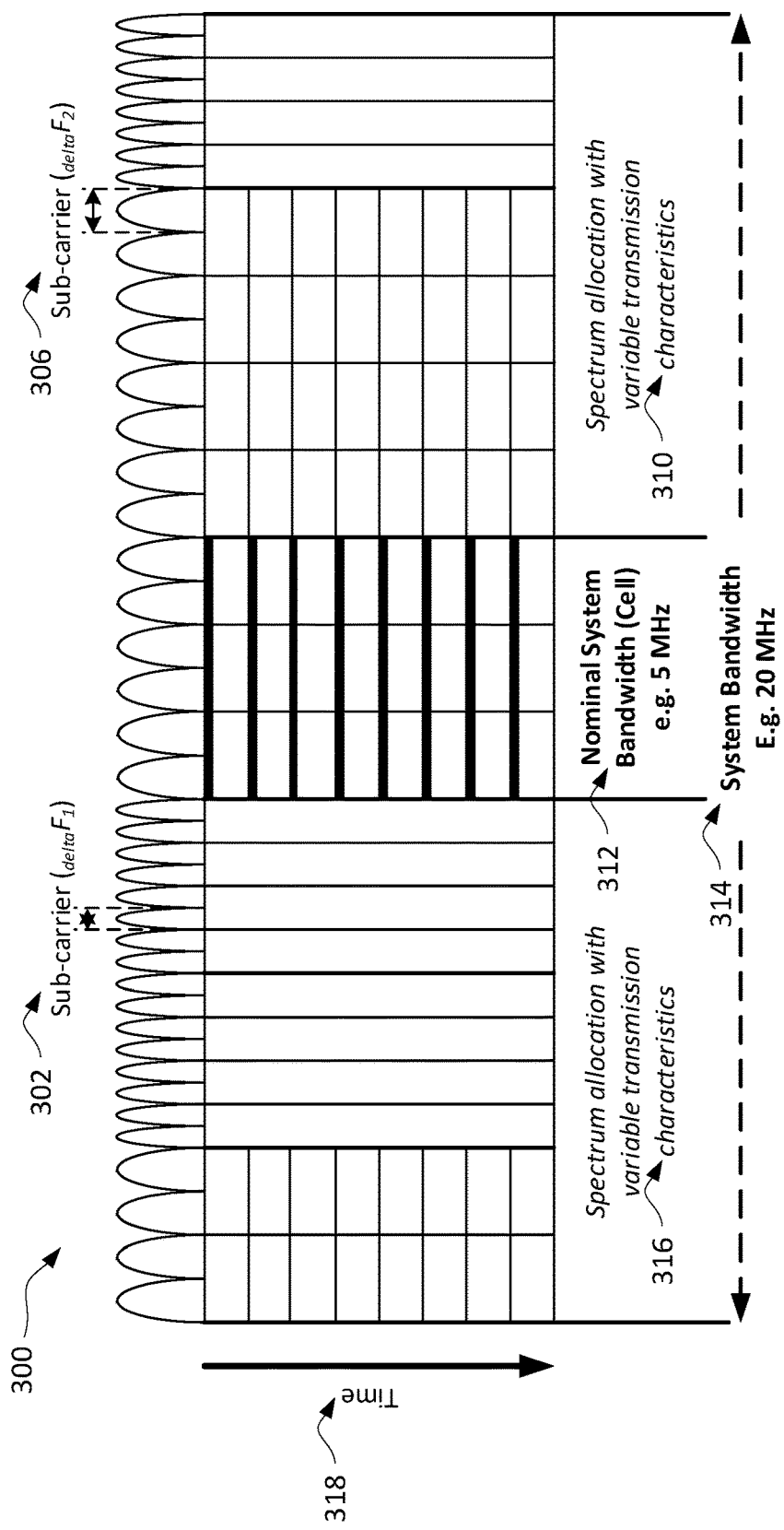
FIG. 3 illustrates an example of flexible spectrum allocation.

FIG. 3 may be an example of spectrum allocation 300 where different subcarriers may be conceptually assigned to different modes of operation. Within the system bandwidth 314, 318 may show time resources, and 312 may show the nominal system bandwidth. The spectrum allocation may be performed on bandwidth 310 and bandwidth 316. The bandwidth 310 and bandwidth 316 may be associated with variable transmission characteristics. For example, the bandwidth for subcarrier 302 and subcarrier 306 may differ.

Different SOM may be used for different transmissions. A SOM may include one or more of the following parameters: a subcarrier spacing, a waveform type, a TTI length, and/or a reliability aspect(s). For example, the reliability aspect may include HARQ processing aspects and/or a secondary control channel. A SOM may refer to a specific waveform. Multiple types of waveforms may be used for one or more SOM types. A SOM may be related to or defined by a processing aspect to be performed by the transmitter and/or receiver. For example, a SOM may support co-existence of different waveforms in the same carrier using FDM and/or TDM. Coexistence of FDD operation in a TDD band may be supported, e.g., in a TDM manner or similar manner.

The spectrum flexibility may include spectrum aggregation. 5gFLEX may use spectrum aggregation. For a single carrier operation, spectrum aggregation may be supported. For example, spectrum aggregation may be supported when a WTRU supports transmission and reception of multiple transport blocks over contiguous and/or non-contiguous sets of physical resource blocks (PRBs) within the same operating band. A single transport block may be mapped to separate sets of PRBs.

Support for simultaneous transmissions associated with different SOM requirements may be used. A multicarrier operation may be supported using contiguous and/or non-contiguous spectrum blocks within the same operating band. Multicarrier operation may be supported using contiguous and/or non-contiguous spectrum blocks across two or more operating bands. Aggregation of spectrum blocks using different modes (e.g., FDD and TDD) may be supported. Aggregation of spectrum blocks using different channel access techniques may be supported. For example, licensed and unlicensed band operation below 6 GHz may be supported.

Support for techniques and/or procedures that configure, reconfigure, and/or dynamically change the WTRU's multicarrier aggregation may be used. A high flexibility for spectrum aggregation may use RF specification work to support additional channels or band combinations. Efficient baseband filtering in the frequency domain may be used.

The spectrum flexibility may include flexible framing, timing, and/or synchronization. Downlink and uplink transmissions may be organized into radio frames. The radio frames may be characterized by a number of fixed aspects (e.g., location of downlink control information) and/or a number of varying aspects (e.g., transmission timing, supported types of transmissions).

The basic time interval (BTI) may comprise an integer number of one or more symbol(s). Symbol duration may be a function of the subcarrier spacing applicable to the time-frequency resource. For FDD, subcarrier spacing may differ between the uplink carrier frequency $f_{UL}$ and the downlink carrier frequency $f_{DL}$ for a frame.

A transmission time interval (TTI) may be used to demarcate timing of transmission and/or the minimum time supported by the system between consecutive transmissions. A consecutive transmission may be associated with different transport blocks (TBs) for the downlink ($TTI_{DL}$) and for the uplink (UL TRx). The UL TRx may exclude a preamble, if applicable. The UL TRx may include control information (e.g., any control information). For example, the control information may be a DCI for downlink and/or UCI for uplink. A TTI may be expressed in terms of integer number of one of more BTI(s). A BTI may be associated with a SOM. Supported frame duration may include 100 us, 125 us or ⅛ ms, 142.85 us (e.g., 1/7 ms is 2 nCP LTE OFDM symbols), and 1 ms. Supported frame duration may enable alignment with the legacy LTE timing structure.

Figure 4:
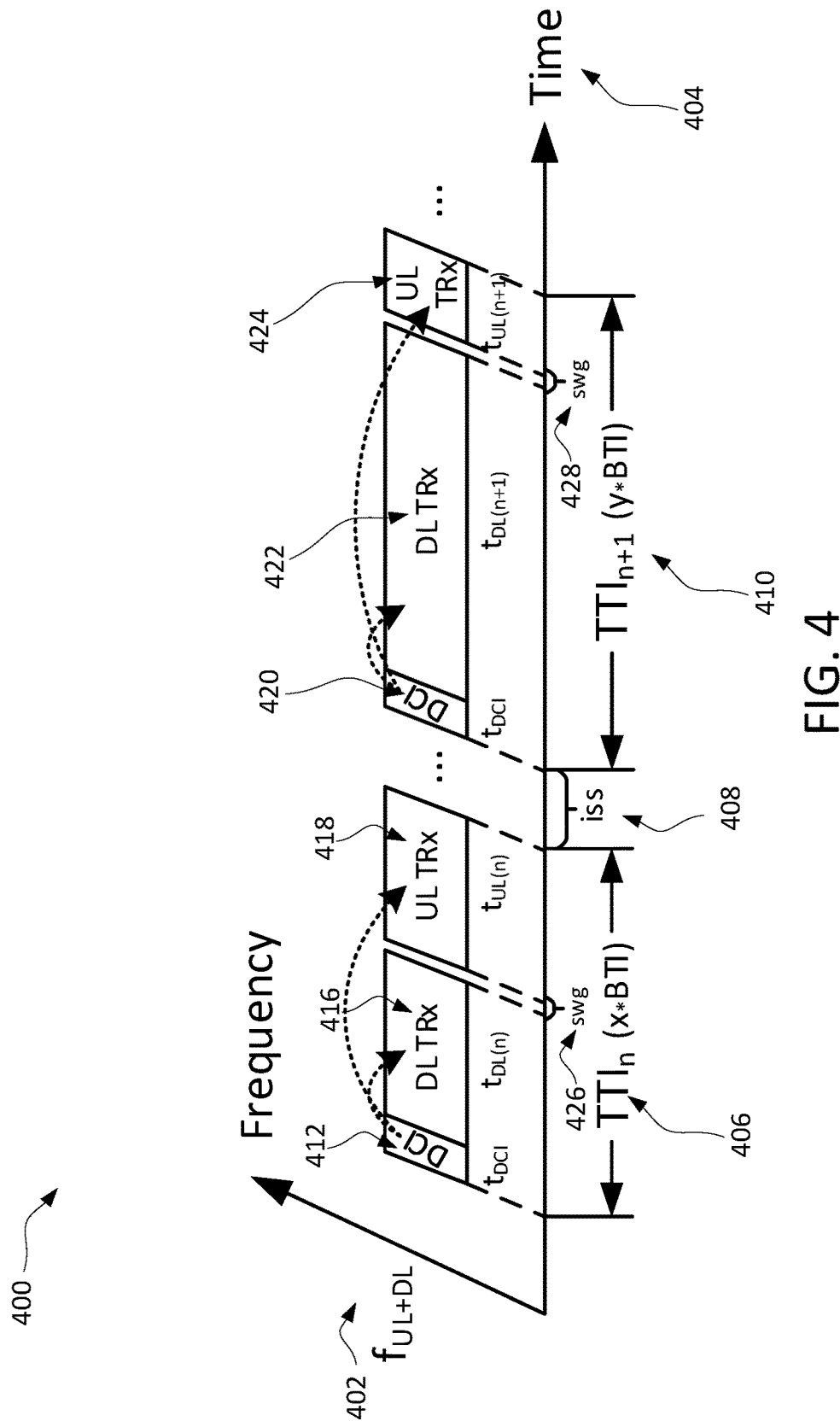
FIG. 4 illustrates an example of timing relationships for time-division duplexing.

Fixed framing aspects may be used in time domain and/or frequency domain. FIG. 4 illustrates an example of timing relationships for time-division duplexing. In a time 404 and frequency 402 domain, a frame (e.g., 406 and 410) may start with downlink control information (DCI) (e.g., 412 and 420, respectively) of a fixed time duration $t_{dci}$ preceding a downlink data transmission (DL TRx) (e.g., 416 and 422, respectively) for the concerned carrier frequency—$f_{UL+DL}$ for TDD (e.g., 402) and $f_{DL}$ (e.g., 502) for FDD. For TDD duplexing, a frame may include a downlink portion (e.g., DCI 412 and 420 and DL TRx 426 and 422) and/or an uplink portion (e.g., UL TRx 418 and 424). A switching gap (swg hereafter) (e.g., 426 and 428) may precede the uplink portion of the frame, if present. The number of resources (e.g., 408) may represent a position of the frame 406 relative to the frame 410.

Figure 5:
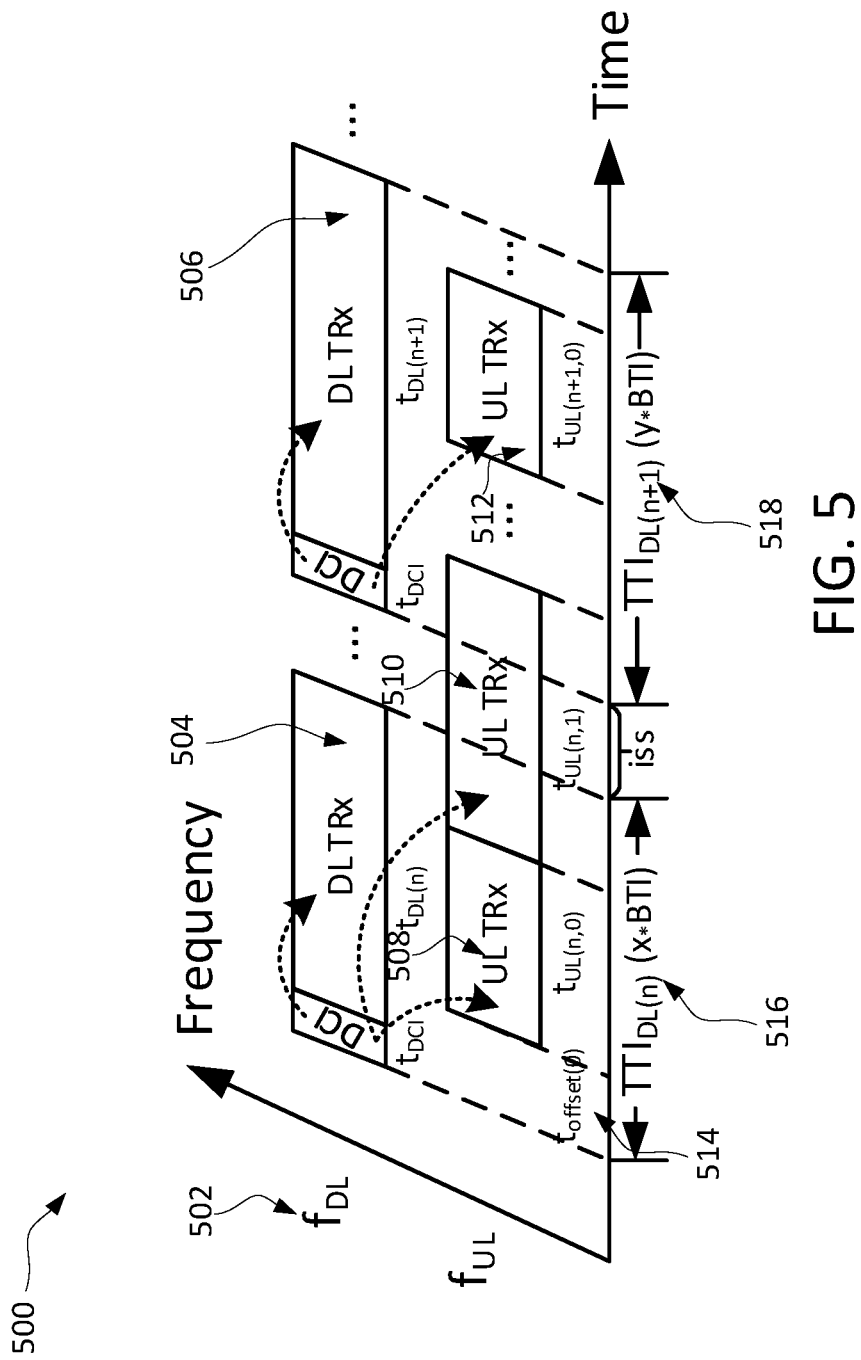
FIG. 5 illustrates an example of timing relationships for frequency-division duplexing.

FIG. 5 illustrates an example of timing relationships for frequency-division duplexing. For FDD duplexing, a frame (e.g., 516 and 518) may include a downlink reference TTI (e.g., 504 and 506) and/or one or more TTI(s) for the uplink (e.g., 508, 510, and 512). The start of an uplink TTI (e.g., 508) may be derived using an offset ($t_{offset}$) (e.g., 514). The $t_{offset}$ 514 may be applied from the start of the downlink reference frame 504. The start of the downlink reference frame (e.g., 504 and 506) may overlap with the start of the uplink frame (e.g., 508, 510, and 512).

For TDD, 5gFLEX may support D2D/V2x/Sidelink operation in the frame. 5gFLEX may include respective downlink control and/or forward direction transmission in the DCI+DL TRx portion. For example, 5gFLEX may include respective downlink control and/or forward direction transmission in the DCI+DL TRx portion when a semi-static allocation of the respective resources is used. 5gFLEX may include respective downlink control and/or forward direction transmission in the DCI+DL TRx portion in the DL TRx portion. For example, 5gFLEX may include respective downlink control and/or forward direction transmission in the DCI+DL TRx portion in the DL TRx portion for dynamic allocation. 5gFLEX may include the respective reverse direction transmission in the UL TRx portion. For FDD, 5gFLEX may support D2D/V2x/Sidelink operation in the UL TRx portion of the frame by including one or more of the following: respective downlink control, forward direction transmissions in the UL TRx portion, reverse direction transmissions in the UL TRx portion (e.g., dynamic allocation of the respective resources may be used), and/or the like. For example, forward direction transmissions in the UL TRx portion and reverse direction transmissions in the UL TRx portion may occur when dynamic allocation of the respective resources may be used. FIG. 4 is an example of a frame structure (e.g., TDD). FIG. 5 is an example of a frame structure (e.g., FDD).

The transmission scheme may be based on scheduling and rate control of multiple modes. The scheduling and rate control may include network-based scheduling, WTRU-based scheduling, and/or logical channel prioritization. A scheduling function may be supported in the MAC layer. One or more of the scheduling modes may be supported: network-based scheduling for tight scheduling in terms of resources, timing and transmission parameters of downlink transmissions and/or uplink transmissions, WTRU-based scheduling for more flexibility in terms of timing and transmission parameters, and/or the like. Scheduling information may be valid for a single or for multiple TTIs for one or more of the scheduling modes herein.

5gFLEX may support a network-based scheduling. A network-based scheduling may enable the network to manage the available radio resources assigned to different WTRUs. For example, the management may include optimizing the sharing of the available radio resources assigned to different WTRUs. Dynamic scheduling may be supported.

5gFLEX may support a WTRU-based scheduling. A WTRU-based scheduling may enable the WTRU to opportunistically access uplink resources. A WTRU-based scheduling may enable minimal latency on a per-need basis within a set of shared or dedicated uplink resources assigned (e.g., dynamically) by the network. Both synchronized and unsynchronized opportunistic transmissions may be supported. Both contention-based transmissions and contention-free transmissions may be supported. Support for opportunistic transmissions (e.g., scheduled or unscheduled) may be included. For example, support for opportunistic transmissions (e.g., scheduled or unscheduled) may be included to meet the ultra-low latency requirements for 5G and the power saving requirements of the mMTC use cases.

5gFLEX may support logical channel prioritization. 5gFLEX may support the association of data available for transmission and/or available resources for uplink transmissions. Multiplexing of data with different QoS requirements within a same transport block may be supported. For example, multiplexing of data with different QoS requirements within the same transport block may be supported when the multiplexing may not introduce negative impact to a service with a stringent QoS requirement. Multiplexing of data with different QoS requirements within the same transport block may be supported when the multiplexing may not introduce unnecessary waste of system resources.

5gFLEX may support forward error correction (FEC) and block coding. A transmission may be encoded using a number of different encoding techniques. Different encoding techniques may have different characteristics. For example, an encoding technique may generate a sequence of information units. An information unit and/or block, may be self-contained. For example, an error in the transmission of a first block may not impair the ability of the receiver to successfully decode a second block. An error in the transmission of a first block may not impair the ability of the receiver to successfully decode a second block if the second block is error-free. An error in the transmission of a first block may not impair the ability of the receiver to successfully decode a second block if sufficient redundancy may be found in the second block or in a different block for which at least a portion was successfully decoded.

Examples of encoding techniques may include raptor/fountain codes. A transmission may consist of a sequence of N raptor codes. One or more codes may be mapped to one or more transmission symbol in time. A symbol may correspond to one or more set of information bits (e.g., one or more octets). The encoding may be used to add FEC to a transmission. The transmission may use N+1 or N+2 raptor codes or symbols (e.g., when a one raptor code symbol relationship is assumed). The transmission may be resilient to the loss of a (e.g., one) symbol. The interference and/or puncturing by another transmission overlapping in time may make the transmission resilient to the loss of one symbol.

The 5G system design may support the transmission of data with different requirements in terms of one or more of the following: latency, throughput, reliability, and/or the like. Different processing principles and transmission properties may correspond to different requirements. For example, data associated to ultra-low latency and/or ultra-reliable use cases may be transmitted using a transmission time interval (TTI). The TTI may be relatively short. The TTI may comprise a modest amount of payload per TTI. Data associated to mobile broadband or massive MTC use cases may be transmitted using a relatively long TTI. For example, data associated with mobile broadband or massive MTC use cases may be transmitted using a relatively long TTI to reduce control channel overhead. Some data may be transmitted with a delay requirement from the time it is generated by the application layer. The delay requirement may be relatively tight. For example, data associated with ultra-low latency or ultra-reliable use cases may be transmitted with a tight delay requirement from the time it is generated by the application layer. The delay requirement may make the overhead of demodulation and reference signals a problematic tradeoff The overhead of demodulation and reference signals may be with respect to the data portion of a transmission. The tradeoff may be in terms of one or more of the following: decoding latency, demodulation/ decoding performance, and/or data throughput. For example, the tradeoff may be in terms of data throughput when a relatively short transmission time is used.

Data throughput may be limited by available resources for data transmission. Resources may be used to transmit data, control information, and reference signals that may be used to estimate channel quality. The resources used for transmitting reference signals may limit the resources available for data transmission. For example, for some or all embodiments that are developed to reduce latency, duration of time transmission intervals may change from one second to one tenth of a second or shorter (e.g., shorter TTIs). The shorter TTIs may limit the available resources for data transmission. Including the set of reference signals may further consume the limited resources. Including the set of reference signals in each shorter TTI may consume the resources significantly.

Reference signals related to a precoder set or a precoding process may be sent in some TTIs rather than all TTIs. Multiple reference signals may be used to determine a channel quality. Various approaches may be used to determine the quality of the channel over which the reference signals may be sent and/or received based on the reference signals. Using multiple reference signals increase the signal to noise ratio of signaling. For example, it may be assumed that noise embedded in the reference signals is random. If the multiple reference signals are used to calculate an average reference signal, the energy of the signals may increase by summing up the reference signals while the impact of noise (e.g., interference) may be reduced by summing up the noise.

Figure 6A:
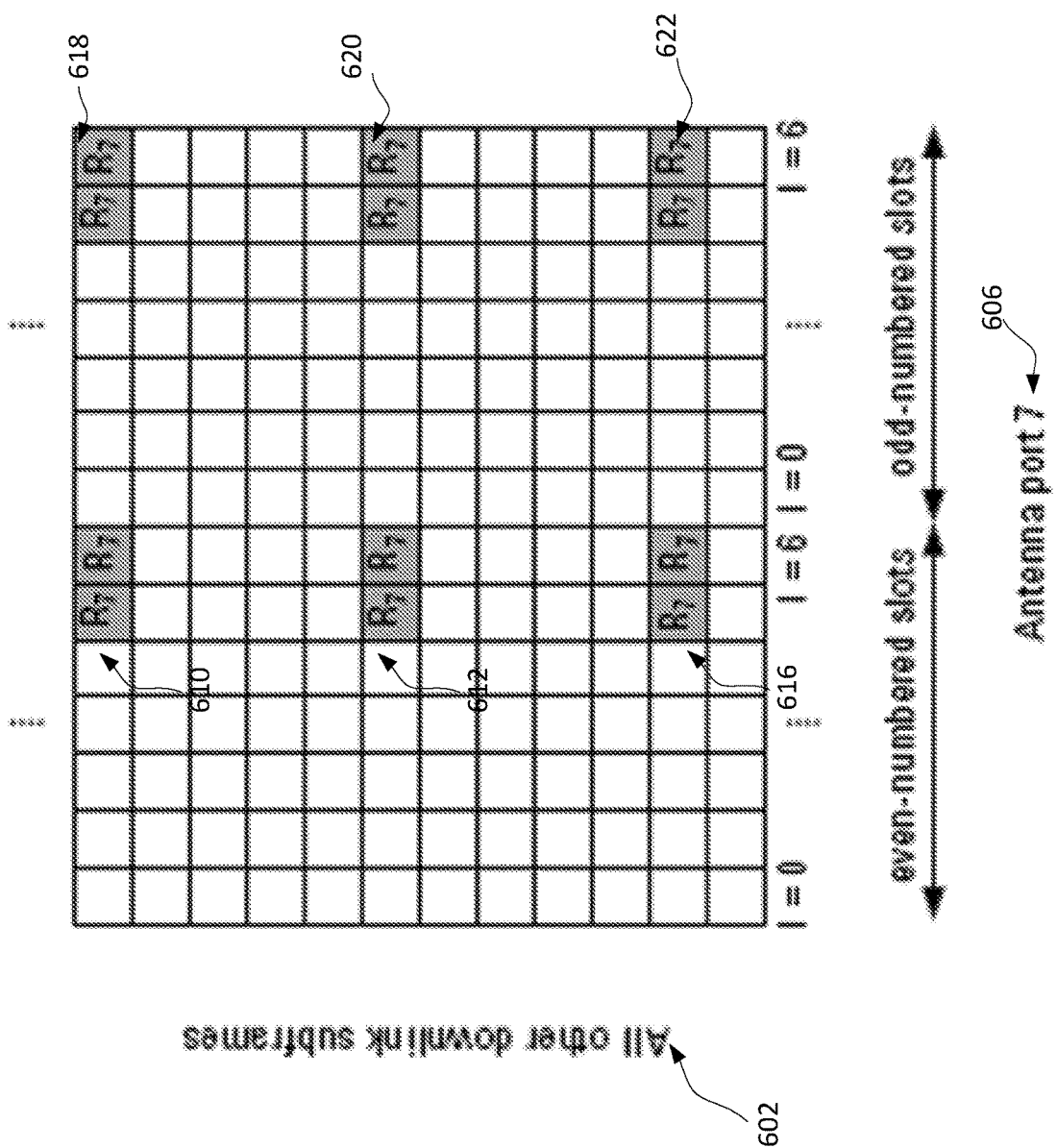
FIG. 6A illustrates an example of a configuration of a downlink subframe.
Figure 6B:
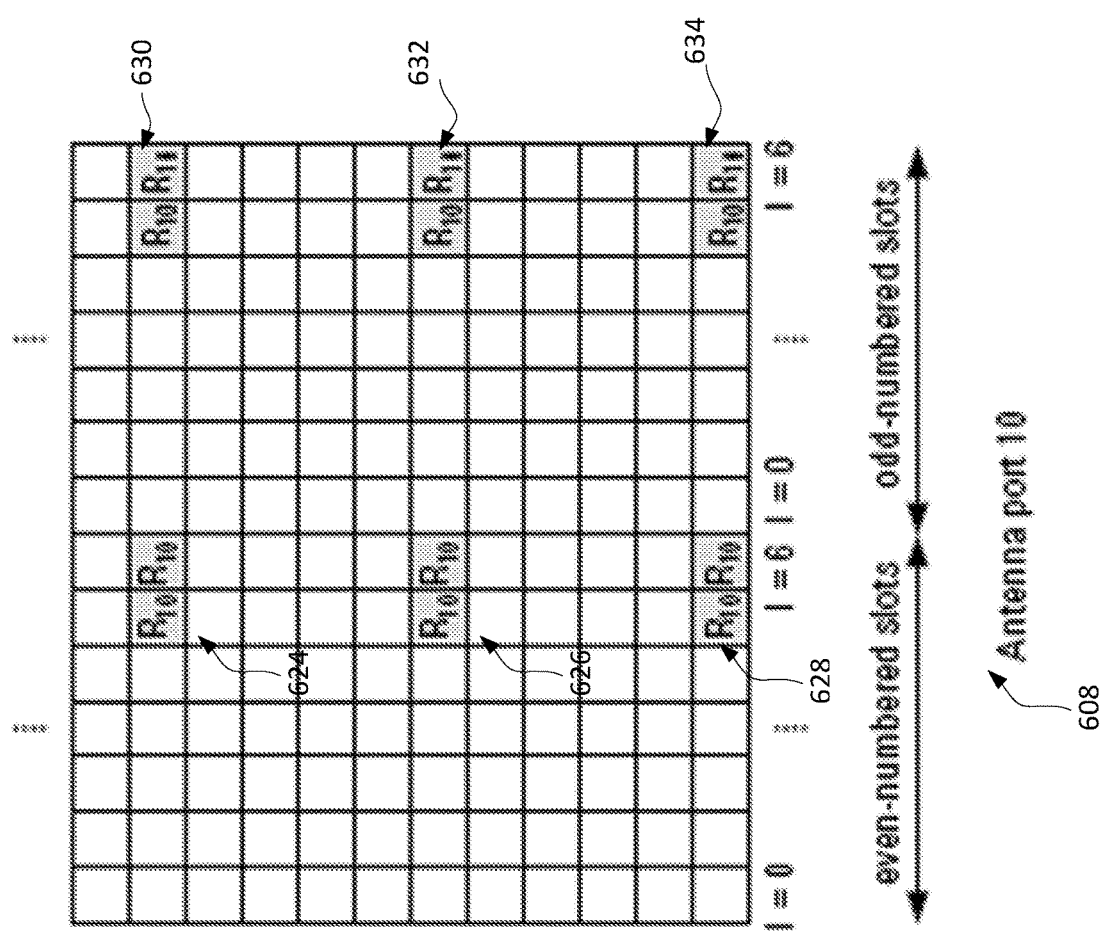
FIG. 6B illustrates an example of a configuration of a downlink subframe.

Reference signals may comprise various characteristics. The characteristics may comprise location, density, and/or other related characteristics of the demodulation and reference signals. The characteristics may be controlled or adapted (e.g., to reduce latency). For example, the control and/or adaptation of the reference signals may be static, semi-static, and/or dynamic. FIG. 6A or FIG. 6B illustrates an example of a configuration of a downlink subframe. FIG. 6A and FIG. 6B may show downlink subframes 602 with a static control of the reference signals. For antenna port configuration 606, the reference signals in the even-numbered slots (e.g., 610, 612, and 616) and the reference signals in the odd-numbered slots (e.g., 618, 620, and 622) may have a relatively fixed location. For antenna port configuration 608, the reference signals in the even-numbered slots (e.g., 624, 626, and 628) and the reference signals in the odd-numbered slots (e.g., 630, 632, and 634) may have a relatively fixed location.

Dynamic control and/or adaptation of the characteristics of the reference signals may be used for a WTRU with a relative high mobility. The dynamic control and/or adaptation may allow for flexible operation in the presence of a fast-changing channel. Dynamic control and/or adaptation may increase flexibility, and the increased flexibility may facilitate multiplexing of transmissions for different WTRUs (e.g., when a system load is relatively high).

A WTRU may receive reference signals and use them to estimate a quality of a channel. A reference signal may be a signal of known properties from a receiver's perspective. A receiver (e.g., a WTRU) may measure a channel and estimate a channel quality based on the measurement of the channel. The WTRU may be configured to transmit and/or receive various types of reference signals. The various types of the reference signals may be utilized for one or more of the following: demodulation of data, timing estimation, channel state information (CSI) measurements, sounding, radio resource management measurements, positioning measurements, and/or the like. For example, a reference signal may consist of a demodulation reference signal (DM-RS), CSI reference signal (CSI-RS), sounding reference signal (SRS), cell-specific reference signal (CRS), and/or a positioning reference signal (PRS). A reference signal may be transmitted in the downlink, uplink, and/or sidelink. A reference signal may occupy a set of resources defined in the time, frequency, and/or spatial (e.g., antenna port) domain. For example, a reference signal may be transmitted over a certain subset of resource elements. A reference signal may be transmitted over subcarriers and/or time symbols over a certain set of resource blocks. A reference signal may be transmitted over a certain subset of resource elements, subcarriers and/or time symbols over one or more antenna ports.

A channel may be assumed to be constant over resources that are used for transmitting the reference signals and resources that are used for transmitting control information and/or data. A receiver (e.g., a WTRU) of the reference signals, the control information, and data may assume that the channel is constant, or approximately constant, over a subset of the resources in time and/or frequency. A receiver may assume that the channel is constant, or approximately constant, over a subset of the resources for a given antenna port. A receiver may assume that the channel for a subset of resources over which a reference signal is transmitted is the same, or approximately the same, as the channel for a second subset of resources used for the transmission of information. The information may be data or control.

Some or all of the assumptions may be valid if certain conditions are met. For example, a duration of a subset of resources associated with a reference signal may be less than a coherence time of a channel. A bandwidth of the subset of resources associated with the reference signal may be less and a coherence bandwidth of the channel. For some or all embodiments, the duration and/or bandwidth of the subset of resources associated with the reference signal may be significantly less than the coherence time and the coherence bandwidth of the channel, respectively. Precoding weights (e.g., a precoder) applied to antennas used by a transmitter of the reference signals may be the same over a subsets of resources. The subset of resources may be used for transmitting the reference signals and for transmitting the control information and/or data.

Some or all of the conditions may be met within a precoding set. The precoding set may comprise a set of resources that are used to transmit/receive reference signals, control information, and/or data. The set of resources may be in time and/or frequency over which the channel may be assumed to be relatively constant. For example, a precoding set may include a configured number of adjacent physical resource blocks (PRBs) in a subframe. The precoding set may include a precoding resource block group (PRG). A WTRU may be configured to employ a precoder over some or all resources of a precoding set when transmitting a reference signal(s). A WTRU may assume that the same precoder has been applied over the resources associated with the precoding set when attempting to receive the transmission. More than one precoding set may be used at a (e.g., given) time to transmit one or more reference signals. More than one precoding set may be used to estimate the channel for different subsets of resources in time and/or frequency.

More than one precoding set may be used to estimate the channel for different subsets of resources for different precoders.

For example, a precoding set may comprise resources used for transmitting the reference signal and resources used for the data transmission. A WTRU may receive a reference signal, measure the channel characteristics based on the reference signal, and receive data transmission based on the measurement of the channel quality. The channel or the channel quality may be estimated for demodulating the data transmission on the precoding set. The channel or the channel quality may be estimated for demodulating a portion of the data transmission on the precoding set. The reference signal (e.g., DMRS) may be used for estimating the channel/channel quality and/or demodulation.

For some or all embodiments, the resources used for demodulating data transmission (e.g., resources used for transmitting/receiving a reference signal) may be different from resources used for the data transmission. The resources used for transmitting/receiving a reference signal may be in a same precoding set as the resources used for the data transmission. The resources used for transmitting/receiving a reference signal may comprise at least one of a resource element, a subframe, a transmission time interval (TTI), a resource block, a physical resource block, a time symbol(s), a time period, a configured duration for an associated process, and/or the like. For example, for a data transmission in an $n^{th}$ time period that is in a same precoder set as a time period that is for a transmission of a reference signal, the channel/channel quality for the data transmission may be estimated using the reference signal. Time resources for transmitting or receiving reference signals may include in one or more of the following: a (e.g., one) previous time period of the precoder set, a (e.g., one) future time period of the precoder set, or a combination of the previous time period and the future time period of the precoder set. The resources of a precoding set may span more than one time period.

Figure 7:
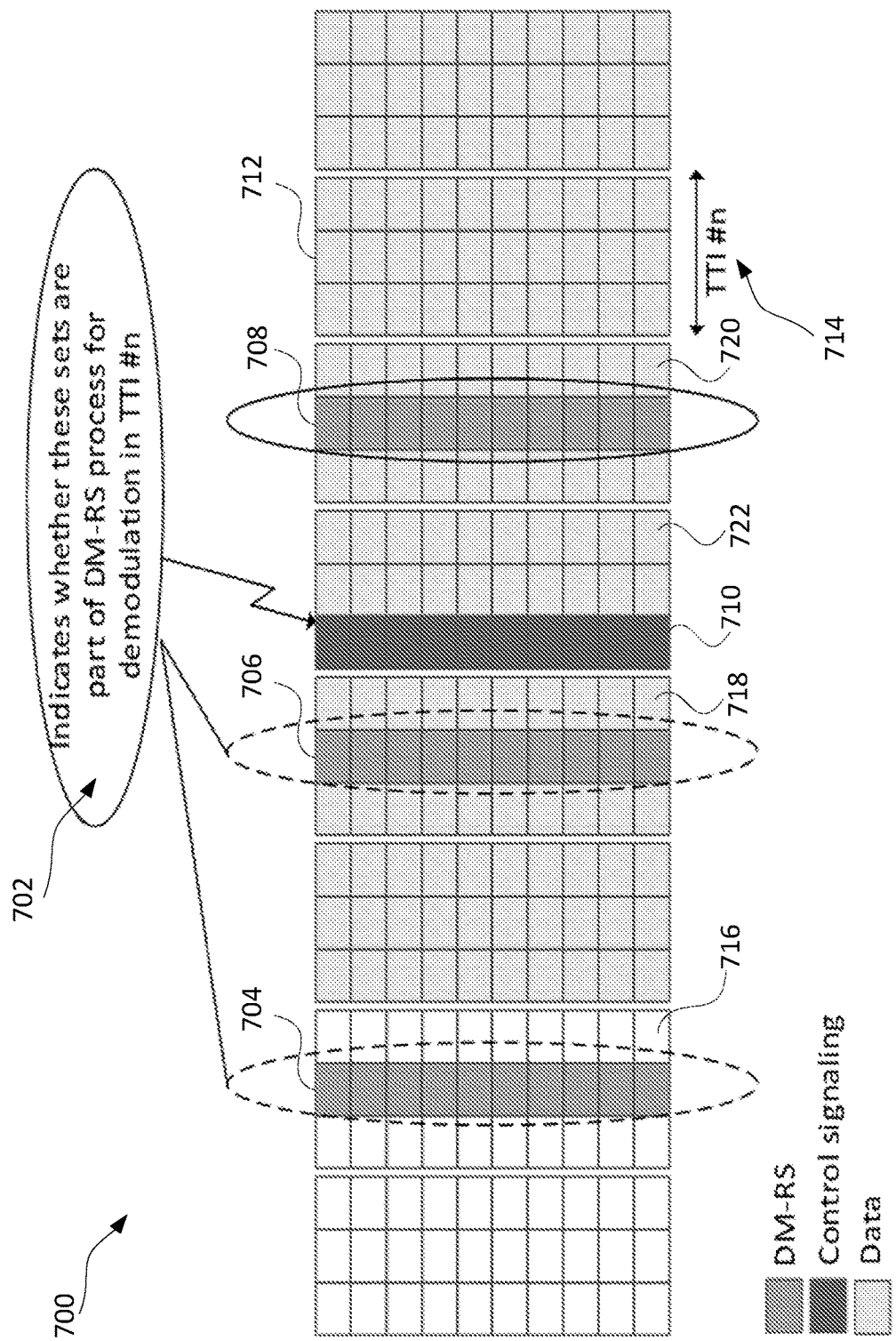
FIG. 7 illustrates an example precoder set in a transmission.

FIG. 7 illustrates an example of using dynamic control signaling to indicate which DM-RSs are associated with a given precoding set or are otherwise associated with a precoding process. As shown in FIG. 7, TTI 716, 718, and 720 may be transmitted/received prior to TTI 714. TTI 716, 718, and 720 each includes a DM-RS in a set of resources 704, 706, ad 708. A DCI 710 may be transmitted/received at TTI 722. The DCI 710 may indicate whether sets of resources 704, 706, and 708 are part of DM-RS process for demodulation in TTI 714. If DCI 710 indicates that sets of resources 704, 706, and 708 are part of DM-RS process for demodulation in TTI 714, a WTRU receiving the TTI 714, 716, 718, 720, and 722 may perform channel estimate based on a combination of the sets of resources 704, 706, and 708. The WTRU may use the channel estimate to receive TTI 714.

The resources that are associated with a precoding set may change over time. The changes of the association of the resources with the precoding set may be signaled dynamically and/or determined according to a time window. A precoding set used for demodulation of a transmission may correspond to a set of resources (e.g., resource elements). The association of the resources with the precoding set may be valid for a certain time. If the changes of the association of the resources with the precoding set is determined according to a time window, a reference time may be used. For example, the reference time may correspond to timing of a transmission minus a threshold. For some or all embodiments, the time within which the resources is associated with the precoding set may not be older than a reference time. The time within which the resources is associated with the precoding set may not be valid for more than a reference time. The reference time may be implicitly or explicitly indicated by downlink control signaling (e.g., based on the timing of the signaling).

The changes of the association of the resources with the precoding set may be dynamically signaled. The dynamical signaling may increase the accuracy of the estimation of the channel/channel quality. The dynamic signaling may allow a WTRU that receives the dynamic signaling to determine a channel/channel quality more accurately. The dynamic configuration may not necessarily use more resources for transmitting the reference signal than static configuration or semi-static configuration. For example, a controller or scheduler may assume and/or determine that a channel/channel quality remains constant over a precoder set/precoder for a (e.g. a given) time duration. The controller or scheduler may configure the precoding set such that some or all resource elements used for transmitting/receiving the reference signal may be combined to obtain the channel estimate. A WTRU may process the signal (e.g., the reference signals) to obtain an estimate of a quantity of interest associated with or representing a channel or channel quality from a subset of the resources. For some or all embodiments, an estimate of a quantity of interest associated with or representing a channel or channel quality may be determined by averaging and/or correlating a sequence of quantities over a subset of resources. The averaging and/or correlation may improve a quality of the estimate of the quantity of interest.

Figure 8:
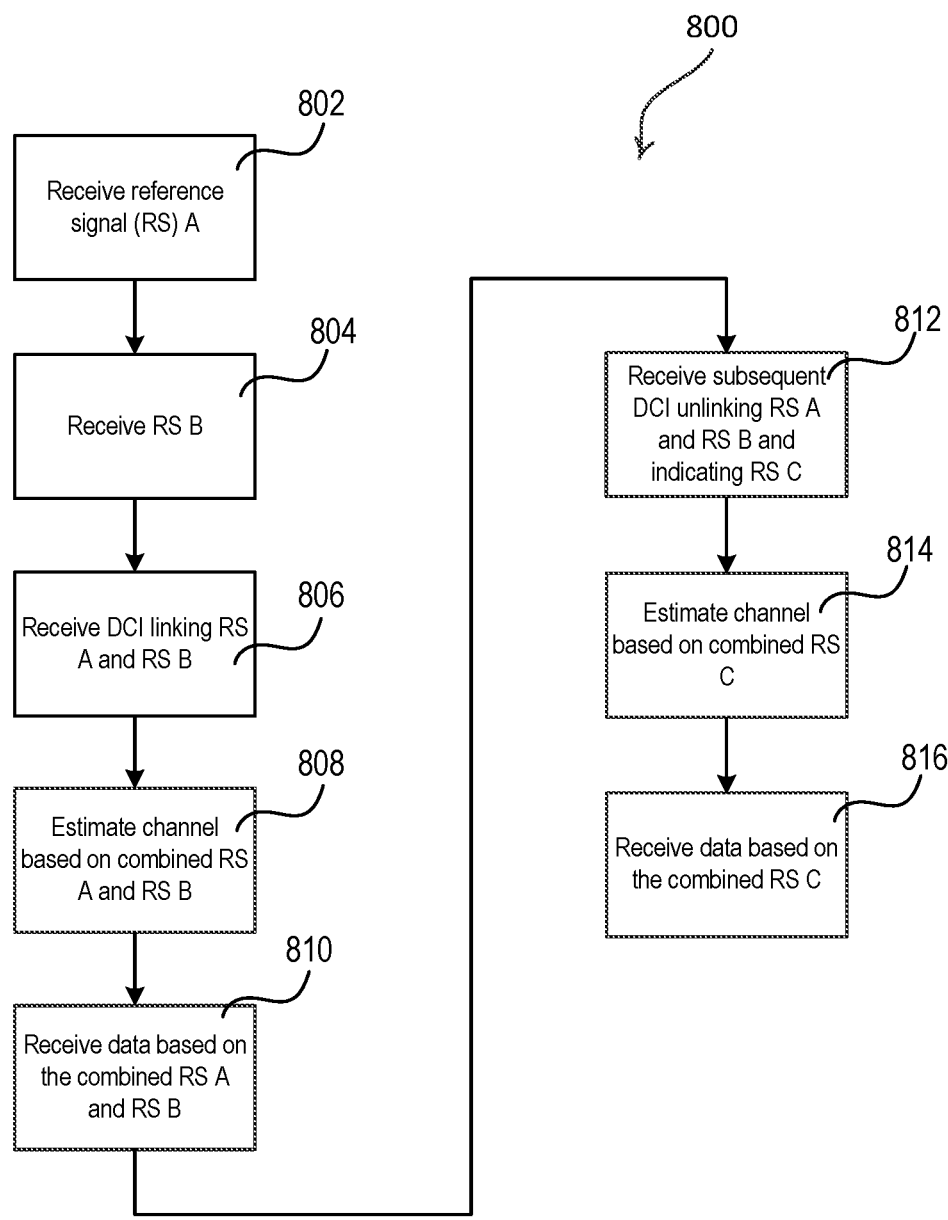
FIG. 8 illustrates an example process flow for channel estimation.

FIG. 8 illustrates an example process flow for channel estimation. As shown in FIG. 8, a WTRU may receive a first reference signal over a first set of resources at 802, and later receive a second reference signal(s) over a second set of resources at 804. The WTRU may receive a downlink control information (DCI) at 806. The DCI may indicate a presence of the first set of resources. The DCI may indicate that both the first reference signal and the second reference signal belong to a precoder set. The DCI may indicate that both the first set of resources and the second set of resources belong to a precoder set. The DCI may indicate a position of the first set of resources relative to a position of the second set of resources. The DCI may indicate the first set of resources may be a number of time resources (e.g., subframes) prior to or subsequent to the second set of resources. The DCI and/or subsequent DCIs may indicate a presence of a third reference signal associated with a third set of resources and/or the position of the third reference signal or the position of the third set of resources. The third reference signal may be associated with the same precoder set. At 808, the WTRU may perform an estimate of a channel or channel quality by combining the first reference signal and the second reference signal over the first set and the second set of resources, and/or the third reference signal. At 810, the WTRU may receive data transmission based on the estimate of the channel or channel quality. At 812, the WTRU may subsequently receive another DCI indicating that the first set of resources and the second set of resources no longer belong to the precoder set. The subsequent DCI(s) may indicate that a third set of resources over which a third reference signal is received belong to the precoder set. For example, the subsequent DCI may indicate that the first set of resources and the second set of resources no longer belong to the precoder set when a network changes precoding weights associated the third set of resources.

At 814, the WTRU may perform an estimate of a channel or channel quality using the third reference signal received over the third set of resources. At 816, the WTRU may receive data transmission based on the channel estimate made over the third set of resources. The WTRU may receive a third DCI indicating that that the third set of resources and a fourth set of resources over which a fourth reference signal is received belong to a different precoder set. The WTRU may measure and estimate the quality of a channel associated with the different precoder set. The WTRU may receive data transmissions over the channel associated with the different precoder set based on the estimated channel quality.

Dynamic configuration of precoding sets may be realized by maintaining one or more precoding processes. A precoding process may be associated with one or more precoding sets. Multiple precoding sets may occupy different resources in the frequency domain. A WTRU may be configured to modify one or more precoding sets associated with a precoding process. For example, the WTRU may be configured to modify a precoding set associated with a precoding process based on one or more of the following: physical layer signaling, higher layer signaling, and/or pre-determined rules.

In the downlink, a WTRU may be indicated one or more precoding processes. A precoding set may be used to demodulate a data transmission according to the precoding process. For example, in FIG. 8, the first reference signal received over the first set of resources at 802 may be associated with a precoding process, and the second reference signal received over a second set of resources at 804 may be associated with the same precoding process. The WTRU may receive a downlink control information (DCI) at 806. The DCI may indicate a presence of the first set of resources. The DCI may indicate that both the first set of resources and the second set of resources belong to a precoder set. The DCI may indicate a position of the first set of resources relative to a position of the second set of resources. The DCI may indicate the first set of resources may be a number of time resources (e.g., subframes) prior to the second set of resources. The DCI may indicate that the first reference signal received over the first set of resources at 802 and the second reference signal received over the second set of resources at 804 may be associated with the precoding process. At 808, the WTRU may perform an estimate of a channel or channel quality by combining the first reference signal and the second reference signal over the first set and the second set of resources. At 810, the WTRU may receive data transmission based on the estimate of the channel or channel quality and/or a configuration according to the precoding process indicated in the DCI.

A precoding process may be associated with multiple precoding sets. Multiple precoding sets may be used to demodulate a data transmission according to the precoding process. For example, in FIG. 8, the first set of resources used to transmit/receive the first reference signal at 802 may belong to a first precoding set that is associated with a precoding process. The second set of resources used to transmit/receive the second reference signal at 804 may belong to a second precoding set that is associated with the same precoding process. The DCI received by the WTRU at 806 may indicate that the first set of resources at 802 and the second set of resources at 804 may be associated with the same precoding process. The DCI may indicate the presence of the first set of resources and the position of the first set of resources relative to the position of the second set of resources. At 808, the WTRU may perform an estimate of a channel or channel quality by combining the first reference signal and the second reference signal over the first set and the second set of resources. At 810, the WTRU may receive data transmission based on the estimate of the channel or channel quality and/or a configuration according to the precoding process indicated in the DCI.

The WTRU may receive a portion of the data transmission based on the first precoding set and another portion of the data transmission based on the second precoding set. For example, the precoding sets may be different in the frequency domain. The WTRU may be indicated that the precoding sets may be different in the frequency domain in physical layer signaling (e.g., from DCI). A WTRU may receive the first portion of the data transmission using frequency resources associated with the first precoding set. A WTRU may receive the second portion of the data transmission using frequency resources associated with the second precoding set.

In the uplink, a WTRU may be indicated one or more precoding processes. Precoders and/or precoder sets may be used for transmitting/receiving reference signals and/or data. The reference signals and/or data may be transmitted/received based on configurations according to one or more precoding processes. The WTRU may determine to use an approach (e.g., any of the approaches described herein) while taking into account multiple factors. One or more of approached may be a function(s) of the factors. The factors may include one or more of the following: the SOM associated with a transmission (e.g., a set or resources, carrier, subcarrier spacing, symbol duration, priority associated to specific data, TTI duration, and/or the like), the physical layer resources associated with the transmission, the control channel and/or one or more characteristic (e.g., radio network temporary identifier (RNTI), location in terms of search space, CCE, and/or the like) associated with the transmission, the control channel and/or one or more characteristics (e.g., RNTI, location in terms of search space, CCE, and/or the like) associated with physical layer resources, received downlink control information, types of reference and/or demodulation signals associated with the transmission, a configuration received by upper layers (e.g., a configured transmission mode), and/or the configuration associated with a specific HARQ process (or a set of HARQ processes).

A precoding process may be assigned a precoding process ID (PPID). The WTRU may modify a precoding process using one or more of the following approaches. The WTRU may use L3 signaling (e.g., RRC Configuration) and/or physical layer signaling to configure and/or control precoding processes. The WTRU may receive the scheduling DCI and control the PPID. The WTRU may control the PPID using a DCI and a WTRU-specific C-RNTI. The WTRU may control a set of SOM-specific PPID.

L3 (e.g., RRC Configuration) may be used to configure, reconfigure, or release a precoding process. The WTRU may receive control signaling from higher layers (e.g., RRC Connection Reconfiguration). The signaling may configure one or more aspects related to a precoding process. The aspects may include one or more of the following: the number of precoding processes, an identity for a precoding process (e.g., PPID), precoding information/configuration, the set of resources associated with the precoding process, reference signal information, a length in time of the precoding processing, a validity time, the associated SOM and/or the like.

For example, the signaling may configure the number of precoding processes. The WTRU may determine that a configured number of processes (e.g., up to a configured number of processes) may be used. For example, the number of processes may be organized as a list of processes. A process may be associated with one or more parameters.

The signaling used to configure a precoding process may configure an identity for a precoding process (e.g., PPID). An identity may be for a configured process (e.g., one identity may be for each configured process). The WTRU may use the PPID to determine to what process downlink control information received is applicable. The downlink control information may be received on a control channel. For example, the control channel may be an (e)PDCCH. The PPID may be indicated on the control channel. The WTRU may use the PPID to associate a transmission with a precoding process. For example, the WTRU may use the PPID to associate a transmission with a precoding process when it receives scheduling information. The scheduling information may include an indication of the applicable precoding process.

The signaling used to configure a precoding process may configure or specify the precoding information/configuration (e.g., precoding weights or matrix). The WTRU may receive a configuration of the precoding(s). The precoding(s) may be applicable to a process and/or to a group of processes. The precoding information/configuration may comprise one or more parameters. The parameters may be used to generate or initialize a sequence. The parameters used may be one or more of the following: a scrambling identity, a RNTI, a cell identity, and/or the like. The precoding information/configuration may include precoder information (e.g., applicable weights). The precoding information / configuration may be indexed. For example, the precoding information/configuration may include an indexed list of precoders. The index may be used in downlink control signaling to indicate what precoding information / configuration to apply for the applicable process(es).

The signaling used to configure a precoding process may configure the set of resources associated with the precoding process. The resources may be in frequency and/or in time. For example, the resources may include one or more set(s) of one or more physical resource blocks (PRBs). The set of one or more PRBs may be consecutive in the frequency domain. For example, the resources may include a serving cell identity. The set(s) of PRB(s) may be associated with a (e.g., specific) serving cell. The serving cell may be a cell of the WTRU's configuration. The serving cell may be associated with a target cell in a case of a reconfiguration. The association may be due to a change of serving cell. The resources may include one or more set(s) of one of more time period(s). For example, a process may be associated with a certain periodicity. A process may be associated with certain subframe(s) among a set of a plurality of subframes. The subframes may be within one or more frames. The set of one or more time period(s) may be a set of one or more of the following: symbol(s), basic time unit, TTIs, and/or a specific TTI duration. For example, the specific TTI duration may be determined based on an associated SOM and/or subcarrier spacing applicable to the associated set of resources. The set of one or more time period(s) may be consecutive in time and/or for the specific SOM.

The signaling used to configure a precoding process may configure reference signal information. The WTRU may be configured with one or more reference signals to use. One or more reference signals may be associated with the process (e.g., precoding process). The reference signals may be associated with an index. For example, the reference signals may be associated with an index when the WTRU is configured with a plurality reference signal configurations, for example, multiple reference signal configurations for a given precoding process.

The signaling used to configure a precoding process may configure a length in time of the precoding processing. For example, the WTRU may be configured with a window size (e.g., time window). For example, the window size may be configured in terms of one or more of the following: basic time units, symbols, TTI, and/or a (e.g., specific) TTI duration. The TTI duration may be determined based on an associated SOM. The TTI duration may be determined based on subcarrier spacing applicable to the associated set of resources. For example, the WTRU may use the window to determine how to average measurement in time.

The signaling used to configure a precoding process may configure a validity time. For example, the WTRU may be configured with a validity time and/or an expiration timer. For example, the WTRU may determine that a state associated to a process is no longer valid after a certain time. The time may be time elapsed after the WTRU last detects a suitable reference signal for the concerned process. The time may be time elapsed since last reconfiguration of the process. The time may be time elapsed after the WTRU last performs a transmission using the concerned process. The time may be time elapsed after the WTRU receives a transmission using the concerned process in case of a downlink process. The time may be time elapsed after the WTRU transmits in case of an uplink process.

The signaling used to configure a precoding process may configure or specify the SOM associated with the precoding process and/or one or more aspects associated with the SOM. For example, the WTRU may receive an identity related to a SOM-related configuration. One or more of the configuration aspects herein may be for a group of one or more processes associated with the indicated SOM. Multiple sets of precoding process(es) may be used (e.g., one for each SOM). In an example, multiple precoding processes may be configured for one or more of the SOMs.

The WTRU may be configured to reset a state associated with a precoding process based on one or more criteria. A precoding process may be added, modified or removed from a (re)configuration, e.g., according to the above, such as by using L3 signaling. The WTRU may reset the state of a precoding process upon the reconfiguration. The WTRU may reset and/or remove a (e.g., any existing) precoding process(es) upon reconfigruation. The WTRU may state or indicate that it resets and/or removes a precoding process(es) when it receives a reconfiguration. The reconfiguration may or may not include a configuration. The WTRU may state or indicate that it resets and/or removes a precoding process(es) when the reconfiguration modifies one or more aspects associated with a precoding process. For example, The WTRU may state or indicate that it resets and/or removes a precoding process(es) when the reconfiguration modifies one or more aspects associated with a precoding process. For example, the reconfiguration may modify one or more aspects associated with a precoding process by removing a serving cell of the WTRU's configuration. In an example, if a reconfiguration does not modify a give precoding process, then that precoding process may not be reset.

The precoding process configurations herein may occur at different granularity. For example, the some configurations herein may be applicable to a precoding process associated with the WTRU. The precoding process configuration may be specific to a serving cell of the WTRU's configuration and/or a group of serving cells of the WTRU's configuration. The precoding process configurations herein may be applicable to a HARQ process or a group of HARQ processes. The precoding process configurations herein may be applicable to a SOM or one aspect of the SOM of the WTRU's configuration or the like.

Some or all of above precoding process configuration aspects or parameters may be dynamically signaled. For example, dynamic signaling of one or more parameters associated with a precoding process may be used to override parameters (e.g., corresponding parameters) used in a static or semi-statically configured precoding process configuration. For example, the overriding may occur for a given precoding process, a given HARQ process, and/or a concerned or given transmission.

Control signaling may be received from physical control channels. Precoding processing may be instantiated, added, and/or modified dynamically using the physical control channel. A WTRU may receive DCI on a physical control channel that may configure, modify, control, and/or adapt one or more aspects and/or parameters related to a precoding processing configuration. The signaling aspects and/or parameters related to a precoding processing configuration may include one or more described herein with respect to L3 configuration signaling. The downlink control signaling may be used in conjunction with L3 configurations (e.g., configurations described herein). The downlink control signaling may include or indicate one or more of the following: the PPID, an index to the applicable precoding information, a reset indication, and/or the like.

The downlink control signaling may include and/or indicate PPID. The WTRU may receive a control signaling with PPID information. The control signaling with PPID information may be for the applicable process(es) (e.g., precoding processes). Control information received with the PPID may be applied to the applicable process(es).

The downlink control signaling may include an index to the applicable precoding information. The WTRU may receive the control signaling with an index to the precoding information (e.g., for the indicated process(es)). The WTRU may receive the control signaling with an index to the precoder to use (e.g., for the indicated process(es)).

The downlink control signaling may include a reset indication. The WTRU may receive the control signaling with an indication to reset one or more precoding processes. The WTRU may be configured to determine that it may perform a reset of the precoding process state for the concerned process(es). The determination may be implicit. For example, the WTRU may be configured to determine that it may perform a reset of the precoding process state for the concerned process(es) when it determines that the applicable resources associated with the precoding processing configuration have been modified. The WTRU may be configured to determine that it may perform a reset of the precoding process state for the concerned process(es) when it determines that the precoding information and/or precoder to use has been modified (e.g., for the indicated process(es)).

The control signaling may include and/or indicate PPID and/or scheduling information and other aspects controlled by the control signaling. For example, a DCI may indicate PPID that identifies the precoding processing configuration applicable to a data transmission for which the DCI includes scheduling information. A WTRU receiving the DCI may determine the precoding process/precoder applicable to data transmission using the PPID in the DCI.

The control signaling may include and/or indicate PPID and/or scheduling information and other aspects controlled by the control signaling separately. For example, a DCI may indicate PPID that identifies the precoding processing configuration applicable to a data transmission. Another DCI may include and/or indicate scheduling information applicable to the data transmission. The DCI indicating the PPID may be a dedicated DCI and or scrambled using a dedicated RNTI. The DCI may use a WTRU-specific cell-RNTI (C-RNTI). The control signaling may be received using a DCI format dedicated to a WTRU-specific C-RNTI. For example, the DCI may be scrambled using a WTRU-specific reference signal C-RNTI (RS-C-RNTI). Cross-carrier scheduling may be applicable to the control signaling herein. For example, a WTRU may be configured to receive the DCI on a carrier different than the one to which the DCI is applicable. The DCI may include a carrier indicator field.

The control signaling may include and/or indicate PPID associated to a SOM (e.g., a set of SOM-specific PPIDs). For example, a DCI may include the control signaling to instantiate and dynamically control one or more precoding processes associated with the SOM. The WTRU may monitor a control channel associated with the SOM.

A demodulation process may include a precoding process used for demodulation. A demodulation process may refer to a precoding process for demodulation of a specific transmission. Which precoding process is used as demodulation process may be indicated dynamically (e.g., using a DCI as described herein). Which precoding process is used as demodulation process may be indicated semi-statically (e.g., using higher layer signaling such as RRC). A precoding state may refer to a set of parameters or properties of a precoding process.

A WTRU may be configured with multiple precoding processes. For example, a SOM may be associated with a precoding process (e.g., one precoding process per SOM). A TTI duration may be associated with a precoding process (e.g., one precoding process per TTI duration). For DL transmissions, a WTRU may be assigned resources by a DCI. The DCI may indicate (e.g., explicitly indicate) to the WTRU a mapping between a demodulation process and a precoding process. The demodulation process may be used to enable demodulation of the DL assignment. A WTRU may maintain and/or have been maintaining channel estimation measurements on the precoding process.

The DCI may indicate the presence of one or more demodulation reference signal within the assigned resources. For example, the resources used for one or more demodulation reference signal (e.g., a subset of total resources assigned by the DCI) may be indicated (e.g., explicitly indicated) in the DCI. The resources used for one or more demodulation reference signal may be a subset of total resources assigned by the DCI. The indication (e.g., explicit indication) may be via a pointer to a pre-configured and/or a semi-static set of configurations. In another example, the resources may be static. The DCI may indicate the presence of one or more demodulation reference signal within the assigned resources via a single bit flag.

The WTRU may use the demodulation reference signal resources indicated by the DCI to enable channel estimation. The WTRU may use the demodulation reference signal resources in conjunction with the precoding process obtained from the demodulation process. The demodulation process may be indicated within the DCI. The indication of a demodulation process along with a set of demodulation reference signals may configure the WTRU to add the demodulation reference signal resources to the appropriate precoding process mapped by the demodulation process. A DCI may indicate a set of demodulation reference signals.

A WTRU may use resources mapped to by the demodulation process to enable demodulation. For example, a WTRU may use resources mapped to by the demodulation process to enable demodulation where the DCI indicates no demodulation reference signal is present within the assigned resources. A demodulation process within the assigned resources may be implicitly indicated. An embedded demodulation reference signal within the assigned resources may be indicated (e.g., implicitly indicated). The implicit indication may be achieved by controlling/configuring one or more of the following: timing of the DCI transmission, timing of the assigned DL transmission, DCI format, search space used for transmission of DCI, SOM used for transmission of DCI, SOM used for assigned DL transmission resources, TTI duration, and/or the like.

The WTRU may determine that an indication of a mapping between the precoding process and demodulation reference signals is no longer valid. A WTRU may be assigned a DL transmission resource in a DCI. The DCI may indicate a demodulation process mapped to a precoding process. For example, a DCI and/or a precoding process may indicate that a set of demodulation reference signals over multiple TTIs use a same precoding process, a same precoding state, a same precoder set, and/or the like. The DCI may indicate that a set of demodulation reference signals over multiple TTIs may be used in combination. The combination of the set of demodulation reference signals over multiple TTIs may enable channel estimation for demodulation. Transmission parameters of the set of demodulation reference signal over the multiple TTIs may remain the same. For example, precoding assumptions and/or transmission power may remain the same. A WTRU may determine that the set of demodulation reference signals over multiple TTIs may not be used in combination. A WTRU may determine that the set of demodulation reference signals over multiple TTIs may not longer be associated with a same precoding process, a same precoding state, a same precoder set, and/or the like. A WTRU may determine the channel estimation may not be done over the entire set of demodulation reference signals (e.g., even though the entire set of demodulation reference signals may still be within the precoding process).

A WTRU may determine that channel characteristics have changed. The WTRU may use a subset of the set of demodulation reference signals associated with the precoding process. For example, the WTRU may send a feedback transmission to the eNodeB(s) that transmitted the set of demodulation reference signals, notifying the eNodeB that the WTRU has determined the channel characteristics have changed, and/or notifying the eNodeB that the set of demodulation reference signals over multiple TTIs may not longer be associated with a same precoding process, a same precoding state, a same precoder set, and/or the like, and/or notifying that the eNodeB that a validity of certain elements associated with the precoding process has expired. The WTRU may indicate/notify the eNodeB(s) that transmitted the set of demodulation reference signals that the WTRU has cancelled and/or flushed out measurement made for the precoding process based on demodulation reference signals transmitted prior to the assigned DL transmission. For example, a WTRU may indicate that the WTRU has cancelled and/or flushed out a measurement made for the precoding process via a bit of feedback.

A WTRU may detect and decode a demodulation DCI. The WTRU may obtain a demodulation process. The demodulation process may be effective for future DL assignments. The demodulation DCI may map a demodulation process to one or more precoding processes. A WTRU may obtain a demodulation process ID in a DCI assigning DL resources. The WTRU may be indicated whether a DL assignment includes resources for demodulation reference signals. The WTRU may be indicated the resources used for demodulation reference signals. The indication of the presence of demodulation reference signals within a DL assignment may be provided dynamically (e.g., within the DCI assigning the resources) or semi-statically (e.g., within an RRC message or within the demodulation DCI). Upon reception of the demodulation DCI, a WTRU may use the demodulation process for future DL assignments on the related resources (e.g., related SOM, TTI duration, subband, and/or subframes). An expiration timer on the validity of the demodulation process may be used. The demodulation process may be valid until a next demodulation process is configured. The demodulation process may be valid until the WTRU determines that it is no longer adequate.

A WTRU may be indicated an UL precoding process. The indication may be explicit (e.g., within a DCI granting UL resources, or within a UL DCI dedicated to the indication). The UL precoding process may include parameters to use for UL demodulation reference signal transmission. The UL precoding process may include rules for the inclusion of demodulation reference signals in an UL transmission. The UL precoding process may indicate that the same precoder as the precoder used in a previous transmission instance of the reference signal for the UL precoding process may be used.

A WTRU may be granted resources for an UL transmission. The WTRU may autonomously reuse the same resources for a future non-network-scheduled transmission. For example, a non-network-scheduled transmission may be done autonomously (e.g., completely autonomously) by the WTRU. A non-network-scheduled transmission may occur when the network indicated resources on which a WTRU may autonomously determine whether or not to perform an UL transmission.

When a WTRU reuses the same resources (e.g., same SOM or PRBs) for a second UL transmission as the resources for a previous first UL transmission with UL demodulation reference signals, the WTRU may not include UL demodulation reference signals in the TTI of the second UL transmissions. The validity of the UL demodulation reference signal from a previous UL transmission for a current UL transmission may be determined by one or more of the following: relative time (e.g., the time between the first UL transmission with demodulation reference signal and the current UL transmission), whether a current transmission is a retransmission of the first UL transmission with demodulation reference signal, an indication in the UL grant, and/or WTRU autonomous determination.

The WTRU's determination of the validity of a previously transmitted UL demodulation reference signal may depend on WTRU measurements of the channel. A WTRU may determine that the precoding state is no longer valid. For example, a WTRU may determine that a precoding state of a previous UL demodulation reference signal transmission is no longer valid due to changes in the channel. The WTRU may be indicated by another node to modify its precoding (e.g., due to high interference). The WTRU may include an UL demodulation reference signal and/or may indicate the presence to the eNodeB. The WTRU may include an UL demodulation reference signal and/or may indicate the presence to the eNodeB. The indication may be on a reserved set of resources for the UL demodulation reference signal indication. For example, the WTRU may include an UL demodulation reference signal when the WTRU autonomously determines that a previous UL demodulation reference signal is no longer valid. The WTRU may indicate the presence to the eNB when the WTRU autonomously determines that a previous UL demodulation reference signal is no longer valid. A parameter of the UL transmission may be toggled by the WTRU to indicate the presence or the lack of an UL demodulation reference signal.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed is:

1. A wireless transmit/receive unit (WTRU) performing dynamic demodulation, the WTRU comprising:
    a memory; and
    a processor configured to:
        receive a first reference signal over a first set of resources during a first time period, the first reference signal being associated with the first set of resources;
        receive a second reference signal over a second set of resources during a second time period, the second reference signal being associated with the second set of resources;
        receive a downlink control information (DCI), wherein the DCI indicates that the first reference signal associated with the first set of resources and the second reference signal associated with the second set of resources are associated with a precoder set, wherein the DCI further indicates a relative timing of the first time period associated with the first set of resources relative to the second time period associated with the second set of resources.

2. The WTRU of claim 1, wherein the processor is further configured to:
    perform a channel estimate based on a combination of the first reference signal and the second reference signal; and
    receive data based on the channel estimate.

3. The WTRU of claim 1, wherein the processor is further configured to receive a second DCI indicating that a third reference signal associated with a third set of resources is not associated with the precoder set.

4. The WTRU of claim 1, wherein the precoder set is associated with a precoding process, and the WTRU is further configured to receive data based on a configuration corresponding to the precoding process.

5. The WTRU of claim 4, wherein the precoding process is associated with an identification.

6. The WTRU of claim 1, wherein the processor is further configured to receive a subsequent indication indicating that the first set of resources and the second set of resources are not associated with the precoder set, wherein the subsequent indication is received in a time subsequent to a time when the DCI is received.

7. The WTRU of claim 1, wherein the processor is further configured to
    receive a subsequent indication indicating that the first set of resources and the second set of resources are not associated with the precoder set and that a third reference signal associated with a third set of resources is associated with the precoder set, wherein the subsequent indication is received in a time subsequent to a time when the DCI is received;
    perform a channel estimate based on the third reference signal; and
    receive data based on the channel estimate.

8. The WTRU of claim 1, wherein the first set of resources comprise a subframe.

9. The WTRU of claim 1, wherein the first set of resources comprise a transmission time interval (TTI).

10. The WTRU of claim 1, wherein the first set of resources and the second set of resources are different.

11. The WTRU of claim 1, wherein the first set of resources and the second set of resources are the same.

12. A network station signaling to a wireless transmit/receive unit (WTRU) performing dynamic demodulation, the network station is configured to:
    send a first reference signal via a first set of resources during a first time period;
    send a second reference signal via a second set of resources during a second time period;
    determine that that the first reference signal and the second reference signal are associated with a precoding process;
    send the second reference signal via the second set of resources and determine a relative timing of the first time period associated with the first set of resources relative to the second time period associated with the second set of resources;
    send a downlink control information (DCI) indicating that the first reference signal and the second reference signal are associated with the precoding process and indicating the relative timing of the first time period associated with the first set of resources relative to the second time period associated with the second set of resources;
    receive an acknowledgment from the WTRU indicating a receipt of the DCI; and
    send data to the WTRU based on the precoding process.

13. A method for performing dynamic demodulation, the method comprising:
    receiving a first reference signal over a first set of resources during a first time period, the first reference signal being associated with the first set of resources;
    receiving a second reference signal over a second set of resources during a second time period, the second reference signal being associated with the second set of resources;
    receiving a downlink control information (DCI) further indicating that the first reference signal associated with the first set of resources and the second reference signal associated with the second set of resources are associated with a precoder set, wherein the DCI indicates a relative timing of the first time period associated with the first set of resources relative to the second time period associated with the second set of resources.

14. The method of claim 13, further comprising
performing a channel estimate based on a combination of the first reference signal and the second reference signal; and
receiving data based on the channel estimate.

15. The method of claim 13, wherein the precoder set is associated with a precoding process, the method further comprising:
receiving a third reference signal over a third set of resources during a third time period, the third reference signal being associated with the third set of resources;
receiving a fourth reference signal over a fourth set of resources during a fourth time period, the fourth reference signal being associated with the fourth set of resources;
receiving a second DCI indicating that the third reference signal associated with the third set of resources and the fourth reference signal associated with the fourth set of resources are associated with a second precoder set that is associated with the precoding process, wherein the second DCI indicates a relative timing of the third time period associated with the third set of resources relative to the fourth time period associated with the second set of resources; and
receiving a first data and a second data based on a configuration corresponding to the precoding process.

16. The method of claim 13, wherein the DCI indicates that the first reference signal and the second reference signal are associated with a precoding process, the method further comprising receiving data based on a configuration corresponding to the precoding process.

17. The method of claim 13, the method further comprising determining channel estimate based on a combination of the first reference signal and the second reference signal on a condition that the first reference signal and the second reference signal are associated with a same precoding process.

18. The method of claim 13, the method further comprising:
performing a channel estimate based on an average of the first reference signal and the second reference signal; and
receiving data based on the channel estimate.

19. The method of claim 13, wherein the DCI indicates that the relative timing of the first set of resources is a number of subframes prior to the second time period of the second set of resources.

20. The method of claim 13, wherein the DCI indicates a presence of the second reference signal.

* * * * *